(12) United States Patent
Kraft et al.

(10) Patent No.: US 7,407,231 B2
(45) Date of Patent: Aug. 5, 2008

(54) VEHICLE SEAT WITH A HEADREST AND HEADREST ADJUSTMENT ASSEMBLY

(75) Inventors: Dieter Kraft, Langenaltheim (DE); Jürgen Hofmockel, Ansbach (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 169 days.

(21) Appl. No.: 11/127,592

(22) Filed: May 12, 2005

(65) Prior Publication Data

US 2006/0087167 A1 Apr. 27, 2006

(30) Foreign Application Priority Data

May 14, 2004 (DE) .................. 10 2004 024 434
Dec. 27, 2004 (DE) .................. 10 2004 062 848

(51) Int. Cl.
  *B60R 22/28* (2006.01)
(52) U.S. Cl. ...................... 297/410; 297/406
(58) Field of Classification Search ............. 297/410, 297/391, 406, 407
  See application file for complete search history.

(56) References Cited

U.S. PATENT DOCUMENTS

| | | | |
|---|---|---|---|
| 3,186,763 A | 6/1965 | Ferrara | |
| 3,603,642 A | 9/1971 | Laessker | |
| 4,111,483 A * | 9/1978 | Jaeger | 297/410 |
| 4,111,484 A * | 9/1978 | Jaeger | 297/410 |
| 4,128,274 A * | 12/1978 | Schmedemann | 297/410 |
| 4,545,618 A * | 10/1985 | Kitamura | 297/410 |
| 4,600,240 A | 7/1986 | Suman et al. | |
| 4,639,041 A | 1/1987 | Furukawa | |
| 4,678,232 A | 7/1987 | Ishida et al. | |
| 5,108,150 A * | 4/1992 | Stas et al. | 297/397 |
| 5,110,185 A | 5/1992 | Schmutz et al. | |
| 5,397,170 A | 3/1995 | Shrock | |
| 5,474,358 A | 12/1995 | Maeyaert | |
| 5,484,189 A | 1/1996 | Patterson | |
| 5,590,933 A | 1/1997 | Andersson | |
| 5,651,584 A | 7/1997 | Chenot et al. | |
| 5,775,777 A * | 7/1998 | Delling | 297/410 |
| 5,860,703 A | 1/1999 | Courtois et al. | |

(Continued)

FOREIGN PATENT DOCUMENTS

DE 3545142 6/1987

(Continued)

OTHER PUBLICATIONS

Abstract of DE 3545142, published Jun. 25, 1987.

(Continued)

*Primary Examiner*—Milton Nelson, Jr.
(74) *Attorney, Agent, or Firm*—Dority & Manning, P.A.

(57) ABSTRACT

A headrest adjustment assembly is disclosed for adjusting the position of a headrest relative to a seatback. The headrest adjustment assembly includes a guide disposed in the seat back, at least one holding bar disposed within the guide, the guide and holding bar being configured with sufficient clearance to allow selective relative longitudinal and transverse sliding, the holding bar being fixed to the headrest, and a clamping element mounted to the seat back for selectively applying a transverse force to the holding bar to thereby fix the position of the holding bar within the guide and prevent relative transverse or longitudinal sliding.

27 Claims, 20 Drawing Sheets

U.S. PATENT DOCUMENTS

| | | | |
|---|---|---|---|
| 6,022,078 A * | 2/2000 | Chang | 297/391 |
| 6,074,011 A | 6/2000 | Ptak et al. | |
| 6,152,531 A | 11/2000 | Deceuninck | |
| 6,508,512 B2 | 1/2003 | Saberan et al. | |
| 6,612,653 B2 | 9/2003 | Takata | |
| 6,619,739 B2 | 9/2003 | McMillen | |
| 6,666,516 B2 | 12/2003 | Grammss et al. | |
| 6,736,461 B2 | 5/2004 | Blair et al. | |
| 6,796,613 B2 | 9/2004 | Klink et al. | |
| 6,805,411 B2 | 10/2004 | Gramss et al. | |
| 6,824,214 B2 | 11/2004 | McMillen | |
| 6,942,293 B2 | 9/2005 | Kluehspies | |
| 7,165,814 B2 | 1/2007 | Gans et al. | |
| 7,284,793 B2 | 10/2007 | Kluhspies et al. | |
| 2003/0111885 A1 | 6/2003 | McMillen | |
| 2003/0151290 A1 | 8/2003 | Gans et al. | |
| 2005/0023878 A1 | 2/2005 | Kluehspies | |
| 2005/0218708 A1 | 10/2005 | Gramss | |
| 2005/0225144 A1 | 10/2005 | Kluhspies et al. | |
| 2006/0119163 A1 | 6/2006 | Gans et al. | |
| 2006/0163928 A1 | 7/2006 | Droche | |
| 2006/0163929 A1 | 7/2006 | Ebbeskotte et al. | |

FOREIGN PATENT DOCUMENTS

| | | |
|---|---|---|
| DE | 19532260 | 3/1997 |
| DE | 29809175 | 10/1998 |
| DE | 19853624 | 5/2000 |
| DE | 102004038707 | 4/2005 |
| DE | 102004007325 | 9/2005 |
| EP | 0829390 | 3/1998 |
| EP | 0976608 | 2/2000 |
| EP | 0990555 | 4/2000 |
| EP | 1277612 | 1/2003 |
| EP | 1502809 | 2/2005 |
| EP | 1582400 | 2/2005 |
| EP | 1686004 | 8/2006 |
| EP | 1752334 | 2/2007 |
| JP | 57144135 | 9/1982 |

OTHER PUBLICATIONS

Abstract of DE 19532260, published Mar. 6, 1997.
Abstract of DE 19853624, published May 25, 2000.
Absract of DE 102004038707, published Apr. 28, 2005.
Abstract of DE 102004007325, published Sep. 1, 2005.
Abstract of EP 1277612, published Jan. 22, 2003.
Abstract of JP 57144135, published Feb. 14, 2007.
English Translation of Search Report from Application DE 05010387.8-1254, published Jun. 1, 2007.

* cited by examiner

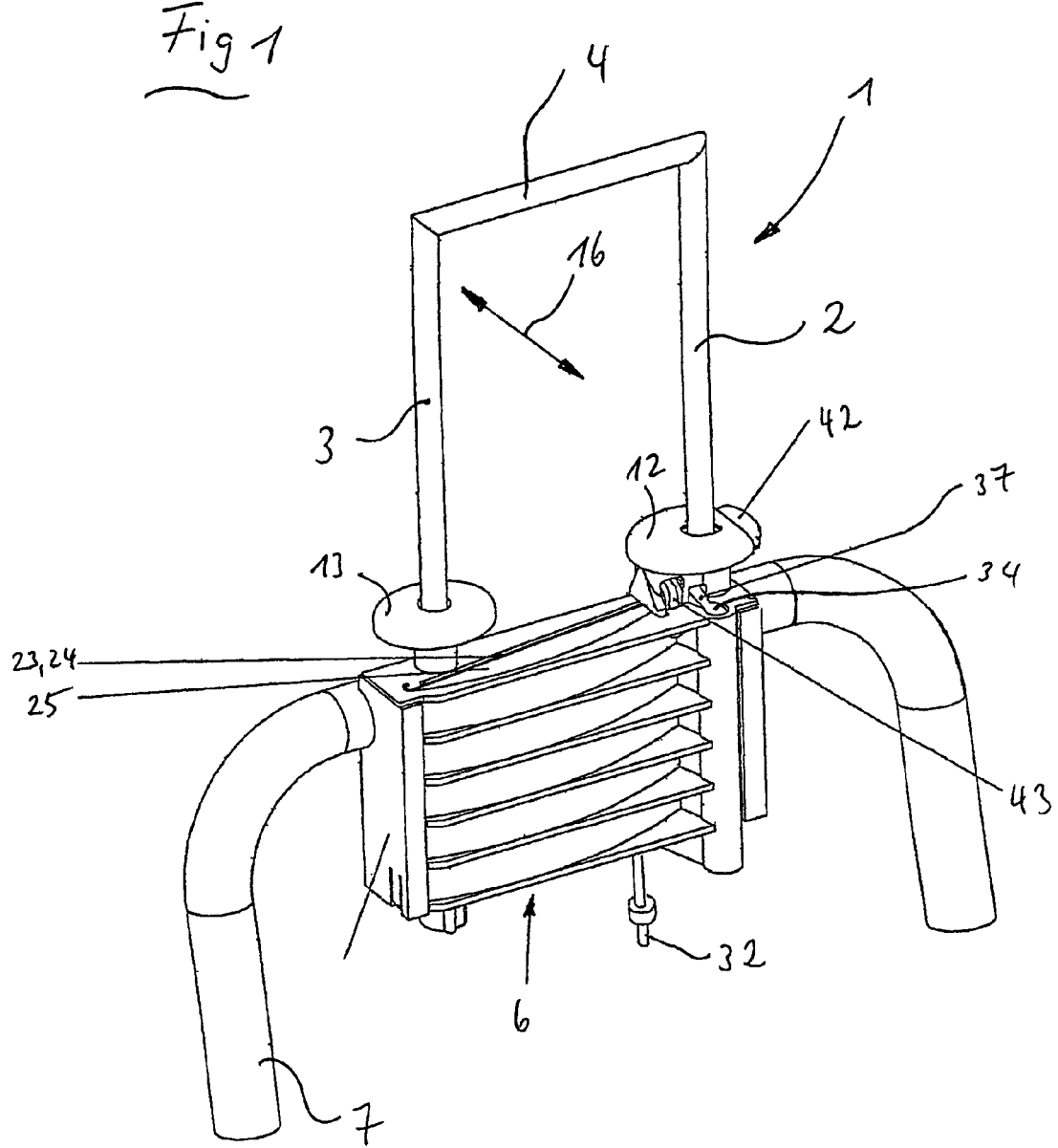

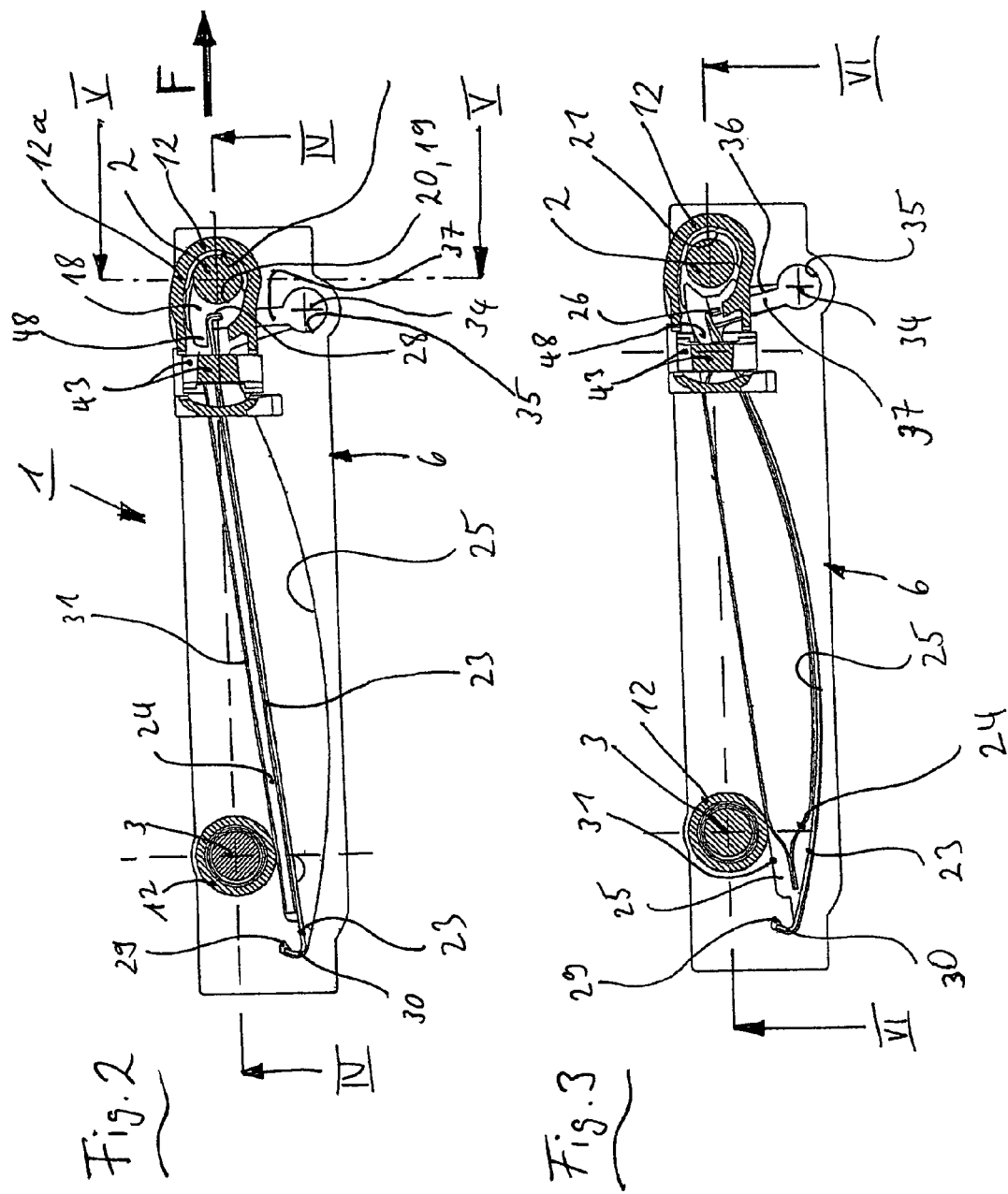

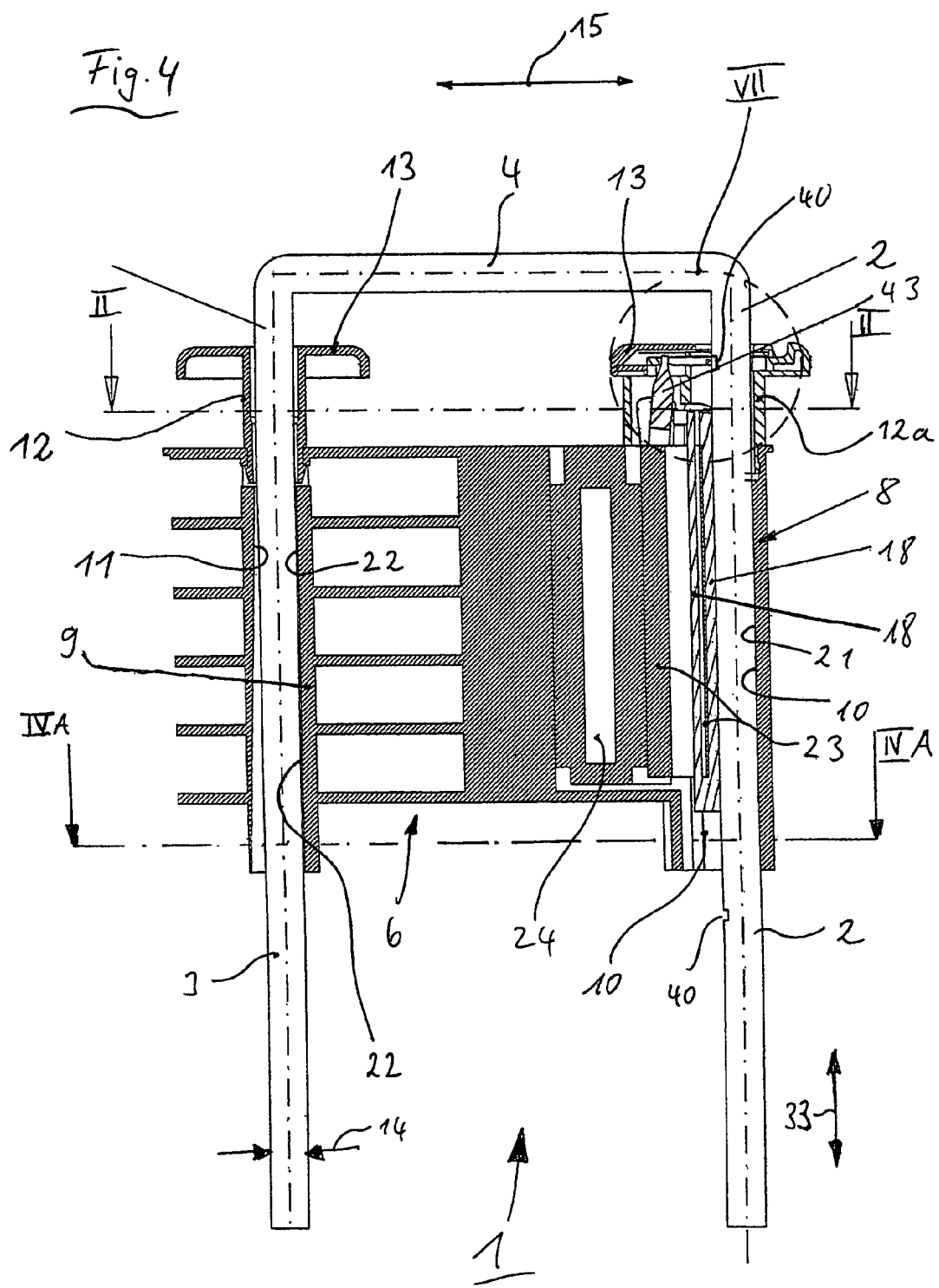

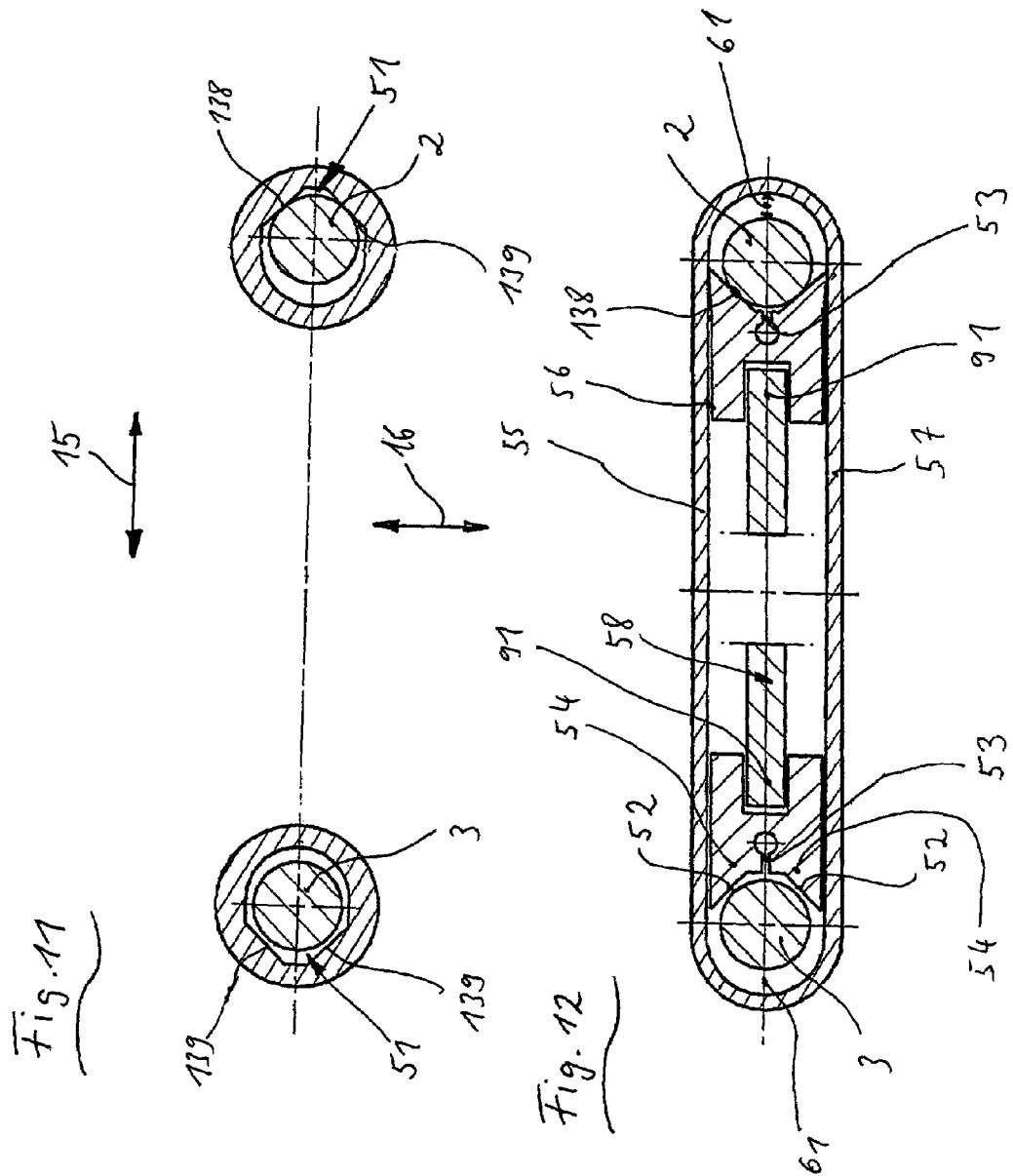

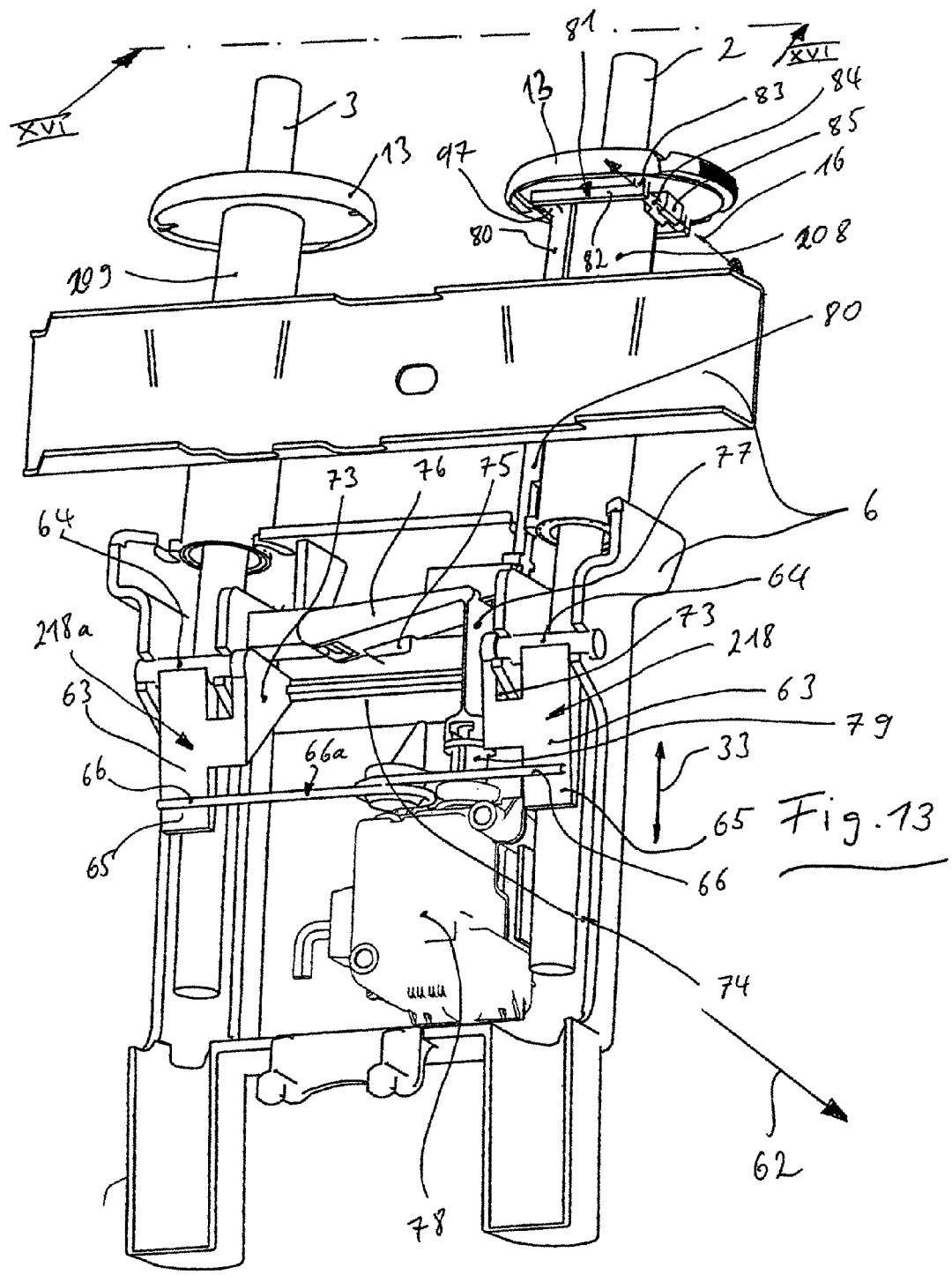

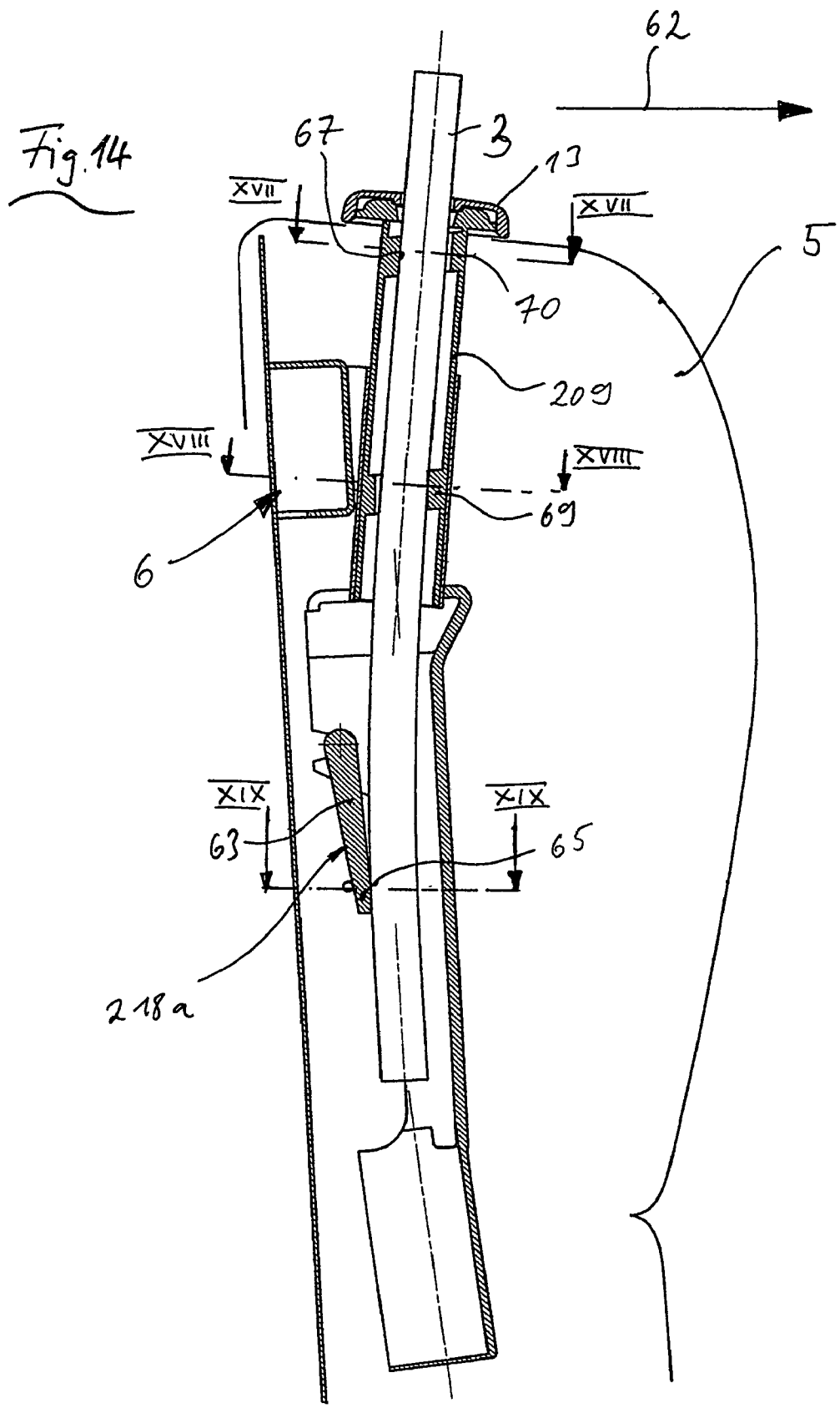

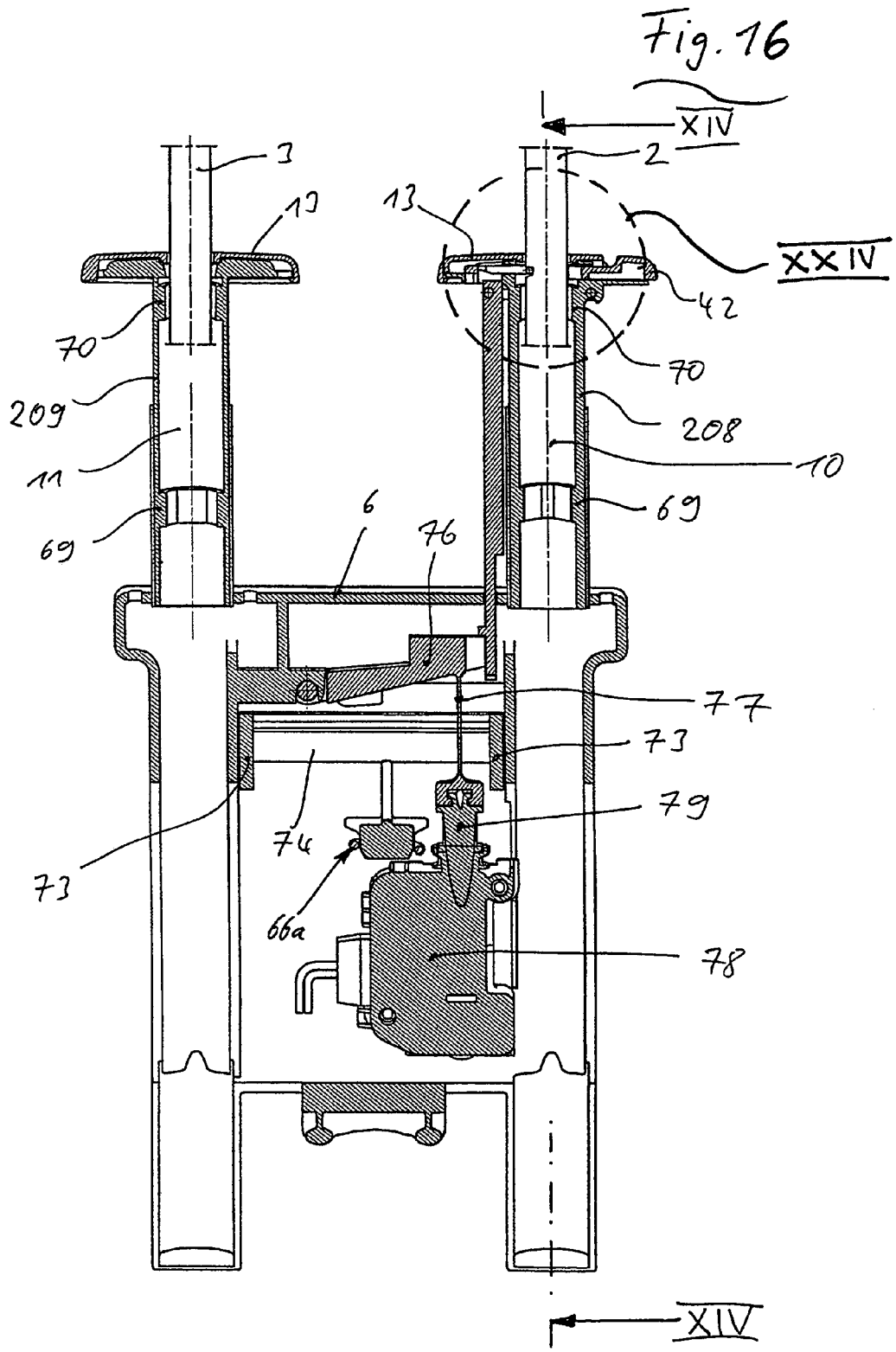

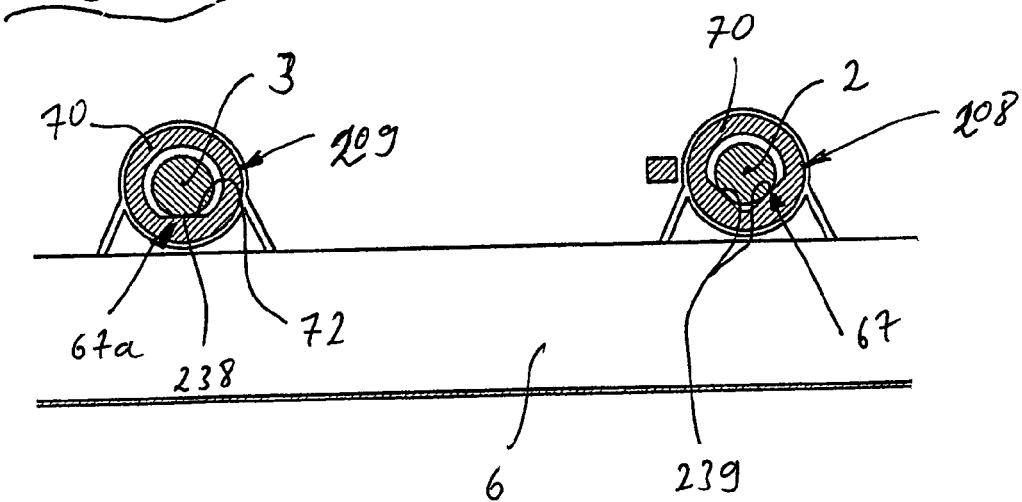
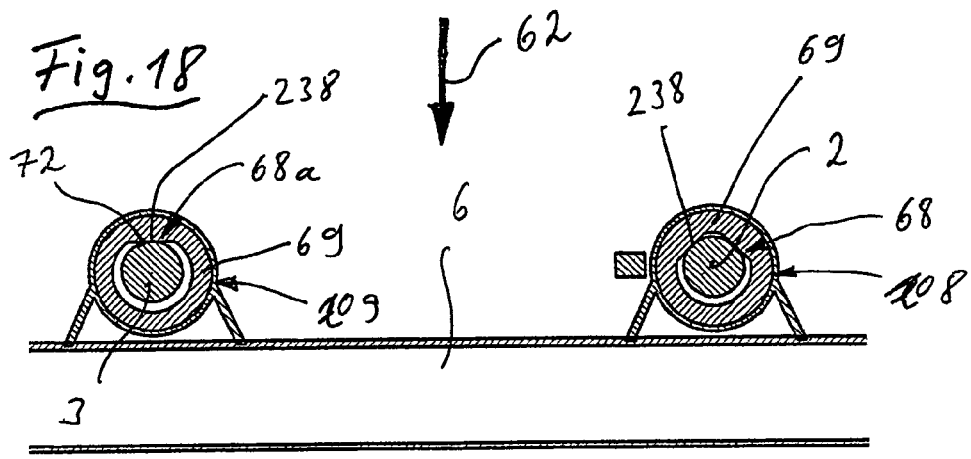
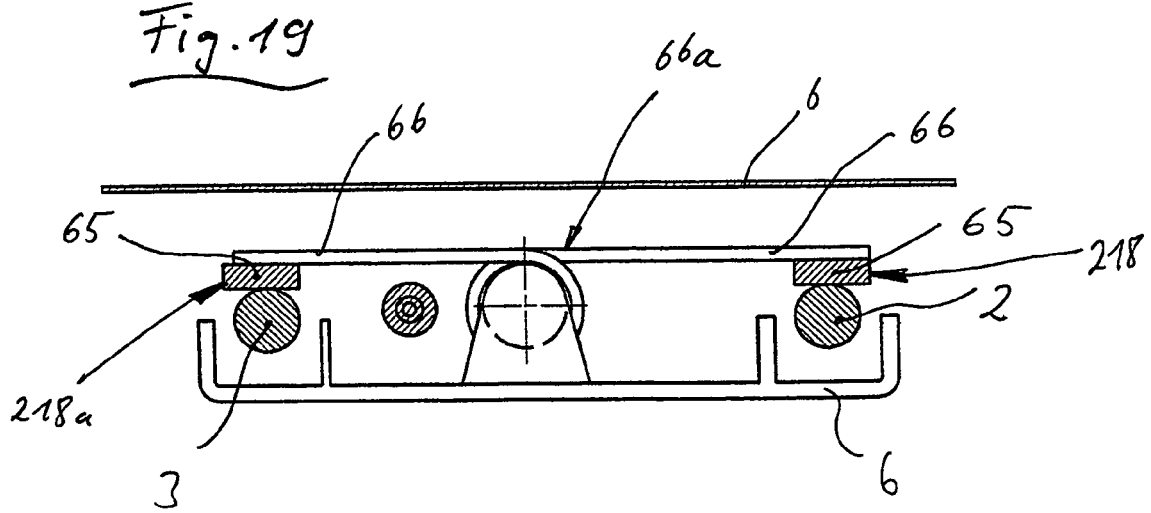

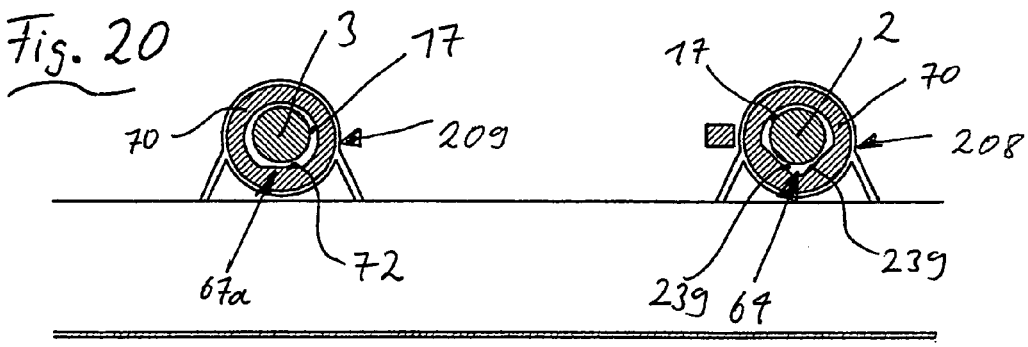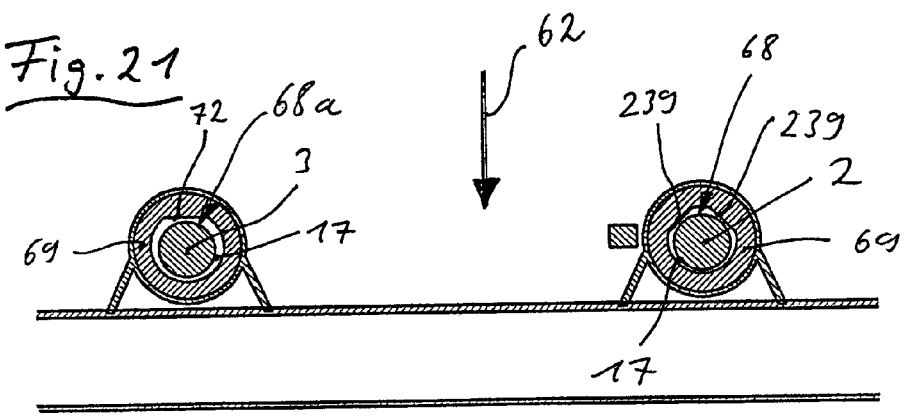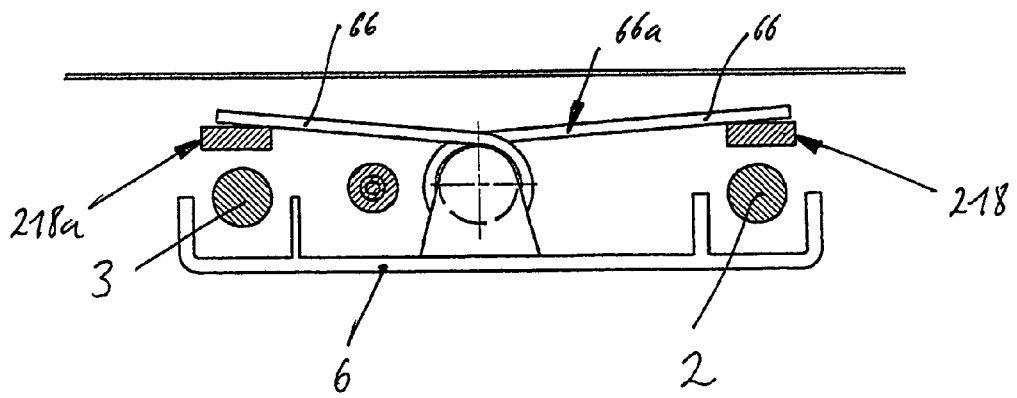

VEHICLE SEAT WITH A HEADREST AND HEADREST ADJUSTMENT ASSEMBLY

FIELD OF INVENTION

The invention concerns a vehicle seat with a headrest having at least one holding bar, which is height-adjustably secured on at least one support base, which itself is enclosed within a reclinable seat back and affixed to a carrying structure, as well as a headrest adjustment assembly.

BACKGROUND OF INVENTION

In order to hold to the lowest possible level the force necessary for the elevation or lowering of a rear seat headrest, whether this be done manually or by remotely actuated, automatic means, it is of advantage if the holding bars of said head rest move within a guide component wherein a radial clearance is present. Counter to this concept, the danger is present, that where such play exists between a holding bar and its support, that the headrest will wobble during driving periods and emit rattling noises. A secure retention of the headrest in the reclining seat back requires, further, auxiliary aids such as springs or motor powered drives, in order to be able to remotely allow the headrest to move into its lowest position. In a backseat arrangement made known by DE 195 32 260 C2, the holding bar of a headrest is held by force in its lowest position of elevation by means of a compression spring acting in that direction. The spring becomes active, if an arresting means, in the form of a spring projection obstructingly resting within a notch in the holder rod is removed therefrom by remote action. The problem which arises is that a wobble-free seating of the headrest is dependent upon friction, whereby high adjusting forces become necessary. From this situation, a large adjustment force of the spring is required, which in turn demands a spring of correspondingly large dimensions. This disadvantage brings in turn, the problem that the user, upon the lifting of the headrest by hand, must overcome not only the frictional resistance between the holding bar and the support, but also force of the spring, which exercises this force in a downward direction. Yet another problem in the described arrangement, and also in the case of a motor powered lowering, is that the active connection between the spring or the drive must finally be dismantled, when the headrest is to be removed from the reclining seat back.

SUMMARY

Based on this background, it is the purpose of the invention to propose a vehicle seat, wherein a headrest of said seat is so supported, that, during operational periods, it is free from play and the therewith associated wobbling and is noiselessly secured in the reclining seat back, and will allow itself to be lowered, without the aid of springs or motor drives, by no more force than its own weight.

This purpose is achieved in accord with certain aspects of the present disclosure, in that a tubular support affixed within the reclined seat back encompasses the holding bar with radial clearance. Further, a clamping element, made movable between a fixed position and a released situation by a remote controlled drive is installed. In addition, when the said clamping element is in its fixed position, a holding bar is subjected to a clamping force impelling it transversely to its longitudinal direction. In this way, the holding bar, with the outer surface of its circumference, is pressed against its support in such a manner, that it now, loaded with its said longitudinally transverse clamping force, becomes stationarily affixed within its support.

By means of this arrangement, a nearly frictionless axial movement, especially during the lowering of the headrest, assures that, between the headrest and one of the guiding supports a completely circumferentially located, radial clearance exists. When the holding bar is not loaded with a clamping force, then the headrest, by virtue of its own weight is free to move unhindered in a downward direction. A fixed and wobble-free seat of the headrest when in use is thereby achieved, in that the mentioned circumferential radial clearance is removed by a clamping mechanism, while the holding bar, upon loading by a clamping force having a frictional contact acting in an axial direction, is pressed into a support. The shape closure between the holding bar and its support is advantageously, thereby effected, in that the support forms a receiving type, circumferential zone, which accepts the holding bar in a form-fit manner. Consideration can also be granted to an embodiment wherein the support possesses a projection, which protrudes radially inward and engages itself in a complementary recess of the holding bar. In spite of the said radial clearance between the support and the holding bar, the said holding bar cannot avoid, during its operational time, coming into contact with a support, especially if the holding bar, for instance, is subject to fabrication tolerances deviating from specified dimensioning and structure. In order to hold the friction to the lowest possible level, the proposal is, in the case of a preferred arrangement, that a protruding receiving element with a point or linear contact zone of the support acts against the circumferential surface of the holding bar.

Normally, in the case of a headrest, a hand-operated arresting agent for the position setting of the headrest at various levels of elevation is present. In order to be able to undertake, in spite of such a design, a remote actuated lowering of the headrest, in a preferred embodiment variant, provision is made that the arresting agent is to be so coupled with the clamping element, relative to movement, that the arresting agent of the holding bar becomes suspended during a released condition of the clamping element. Also, in that state of the clamping element wherein a fixing position is possible, a release is effected of the arresting agent, and therewith the said elevation adjustment of the head rest by hand becomes possible. At the same time, the clamping elements exert their force on the holding bars.

In order to reduce the expenditure of force upon the lifting of the headrest, a clamping element can be aided in the direction of subject securement by a spring element, which can also be designed as a gas-spring and be activated in an opposite direction by a servomotor. This has the advantage, that the clamping element presses the holding bar permanently and with nearly the same clamping force against its circumferential surface, even if this, for instance, depends under the condition of tolerances on the lifting of the headrest. Consideration can also be given to a bidirectional movement coupling between the arresting apparatus and a clamping element. With the release of the arresting apparatus by hand, then also, the clamping on the holding bar is relieved, so that, upon the lifting of the headrest, only the weight thereof need be overcome.

In the case of headrests, which posses a second holding bar in connection with the first holding bar, provision has been made, that in a cross direction, that is, in a direction running transverse to the longitudinal axis of the vehicle, at least one of the two holding bars is subjected to the force of a clamping element. Since both holding bars are, movementwise, coupled together, then the release of the radial clearance between the holding bars and their support is carried out in a first embodiment variant, so that both holding bars, simultaneously are impelled in a transverse direction and, with the aid of one clamping element, are actively form-fit pressed into a corresponding, vehicle axis following the direction of the vehicle. As this is done, it suffices when only one holding bar is retainingly loaded by one clamping element. In a second method variant the necessary radial clearance for lowering the headrest is released, in that both holding bars, by a change in their separating distance, are elastically deformed and are pressed into a recess of a ring bearing thereby. By means of the elastic deformation, the holding bars are brought out of their original parallel alignment and assume a converging mutual position.

In the case of embodiment variants, wherein at least one holding bar is subjected to force in the transverse direction by a clamping element, provision is advantageously made, that in the fixed position, between the clamping element and a holding bar, an effective form-fit is achieved in the longitudinal direction of the vehicle. The clamping element takes over, when this is done, the function of a basic support in the said longitudinal direction of the vehicle. Should, for example, there be a headrest with two holding bars, a three-point support could be provided, and it would be sufficient, if a clamping element fulfills one support function and yet additionally, for each holding bar, there would still be one support of the above described kind. The form-fit between the holding bar and the clamping element is, advantageously, so carried out, that that surface, which is coacting with the circumferential surface of the holding bar, has a complementary concave shape, whereby a receiving zone for the said holding bar is formed.

In the case of one embodiment example, wherein, principally, a holding bar is subjected to force by a clamping element, provision is made, that a drive of a spring element exerts itself on the clamping element in the direction of the desired fixation, while an oppositely directed servomotor seeks to place the holding bar in its release position. Such a drive can easily be installed within the reclining seat back between the two holding bars, whereby the outside dimension in the direction of travel can be held to relatively small proportions. This reduction of installation space is generally the case, if a leaf spring is employed as the said spring element, the one end of which leaf spring abuts a stationary base and the free end thereof is connected with the clamping element. As a servomotor, there is provided on a flat side of the leaf spring an air spring with a controllable filling capability, which is changeable with the curvature of the leaf spring.

The advantage of that said drive is that it is comprised of only two, simply made components, which run reliably, for a long operational life. These two components consist of the said leaf spring and air spring. Likewise, there can be considered a membrane cylinder, that is, a so-called pressure cylinder, which is spring induced to move in the affixing direction.

In an additional advantageous, variant embodiment, each holding bar is assigned one clamping element, whereby the holding bars, when in a fixed position, are subjected to forces acting in the opposite direction from that of the clamping forces. The clamping elements and a common, servo drive assigned to them, in this arrangement, are advantageously placed between the holding bars. In other words, the holding bars are bent away from each other, causing an increase in their separating distance and are respectively conducted into a ring bearing.

This said bearing arrangement assures a form-fit, which is transverse to the clamping force, i.e., thus an effective connection in the longitudinal direction of the vehicle. Advantageous to this application of force from the clamps, is that upon a failure of the clamping elements, the holding bars spring back into their original parallel alignment, whereby the original radial clearance between them and the supports, that is the clamping elements is again established, so that a nearly frictionless lowering of the head is enabled. To reduce the driving force of the two clamping elements, provision has been made that these are bound together by a knee linkage with a servomotor.

In the case of the embodiment examples described up to this point, the clamping of the holding bars is carried out in a transverse direction. In an additional embodiment, one holding bar is subjected to a clamping force exercised in the direction of travel. The holding bar is also held in an upper and a lower ring bearing, whereby the clamping force will now be applied at a location underneath the two said ring bearings. The holding bar, in this arrangement, receiving force over a circumferential area facing the direction of travel, is pressed into a recess within the lower ring bearing and simultaneously receives force over a circumferential area facing away from the direction of travel, whereby it is pressed into a recess within an upper ring bearing. Upon the application of a clamping force, thus the holding bar secures itself on the lower ring bearing in the manner of a whip, whereby the holding bar in the upper ring bearing is stationary and under pressure. In this way, without even an elastic deformation, the holding bar assures a sufficient fixation of the headrest in the axial direction. A clearance-free seat in the transverse direction is achieved therein, in that the ring bearings, as in the case of the above described embodiment examples, work in form-fit combination with the holding bar. This form-fit is, however, only provided by one holding bar. In the possible case that a second holding bar is involved, then the receiving recesses of the ring bearings are so adapted, that these enable a clearance for the holding bar in the transverse direction. In this arrangement, it is of advantage, that in a case of a failure of parallelism, this failure being possibly a diverging alignment of the two holding bars, the second bar can execute a sideways movement, during the lifting and the lowering of the headrest in the supports provided for this purpose. A error in the parallel alignment of the holding bars does not increase either the friction or the therewith associated adjustment force during a gravity based lowering nor by a manual lifting of the headrest.

Advantageously the desired clearance in the transverse direction is achieved, in that the receiving recesses possess a detent surface active in the transverse direction as well as in the longitudinal direction.

The available installation space of a reclining seat back in the longitudinal direction of the vehicle is, by its nature, very limited. In the case of a preferred variant, on this account, the clamping elements are also designed as lever arms, which are pivotal about an axle running in the transverse direction, and can coact, with their downward pointing free ends with a holding bar. The lever arms run in a space-saving manner in the longitudinal direction of the said holding bars. For the movement of the clamping elements, in their released state, these elements possess extended projections, which extend themselves in the direction of travel, as well as, again in a space-saving manner, into the space existing between the holding bars. The free ends of the said extended projection are bound to one another by means of a bridge section, which can be hingedly swung downward by a servomotor. The said servomotor can be installed with little demand of space in the reclining seat back in the vehicle longitudinal direction.

BRIEF SUMMARY OF THE DRAWINGS

In the following, with the aid of the attached figures showing one advantageous embodiment, the invention will be described and explained in greater detail. There is shown in:

FIG. 1 a perspective of a first embodiment of a vehicle seat with a headrest, whereby, principally a carrier structure of the reclining seat back is visible, FIG. 2 a cross-section of the assembly of FIG. 1, taken along line II-II of FIG. 4, FIG. 3 a cross-section of the assembly of FIG. 1, taken along line III-III of FIG. 6, FIG. 4 a cross-section of the assembly of FIG. 1, taken along line IV-IV in FIG. 2, FIG. 4a a cross-section of the assembly of FIG. 1, taken along line IV A-IV A of FIG. 4, FIG. 5 a cross-section of the assembly of FIG. 1, taken along line V-V in FIG. 2, FIG. 6 a cross-section of the assembly of FIG. 1, taken along line VI-VI of FIG. 3

DETAILED DESCRIPTION

Figure 4A:
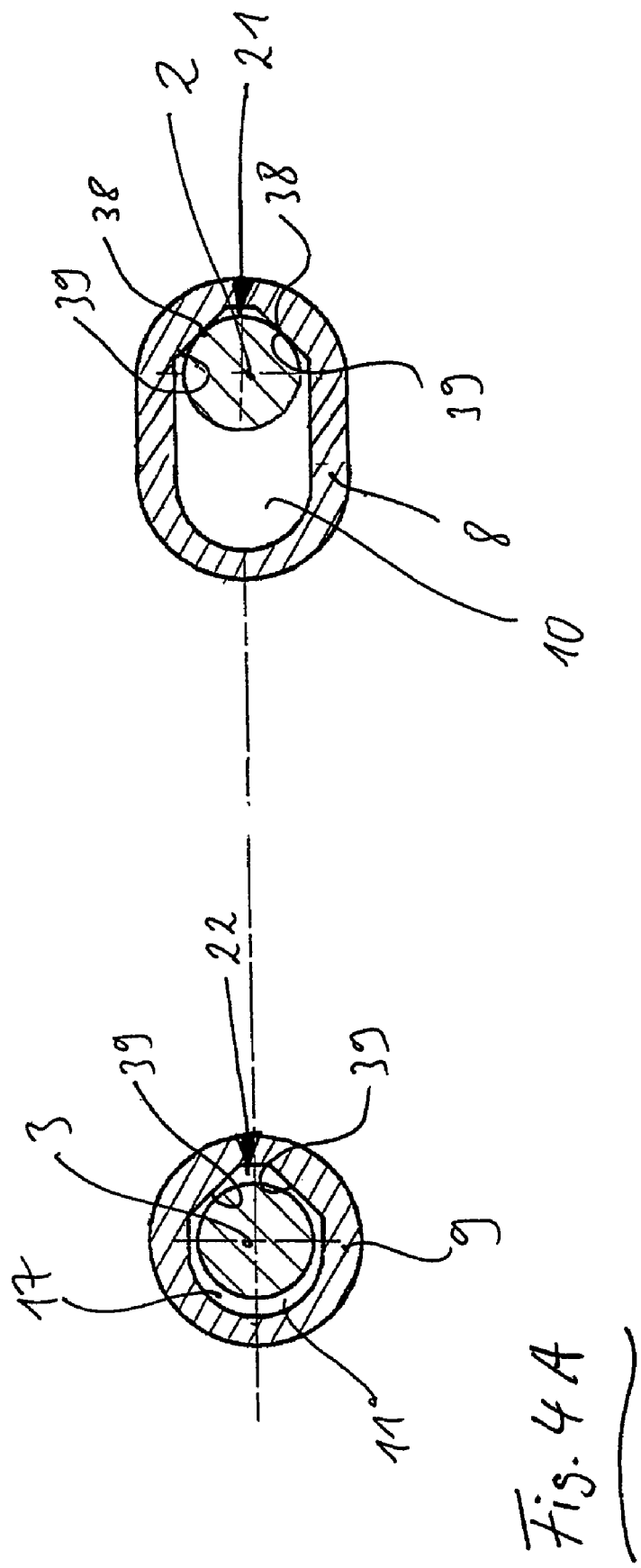
Figure 5:
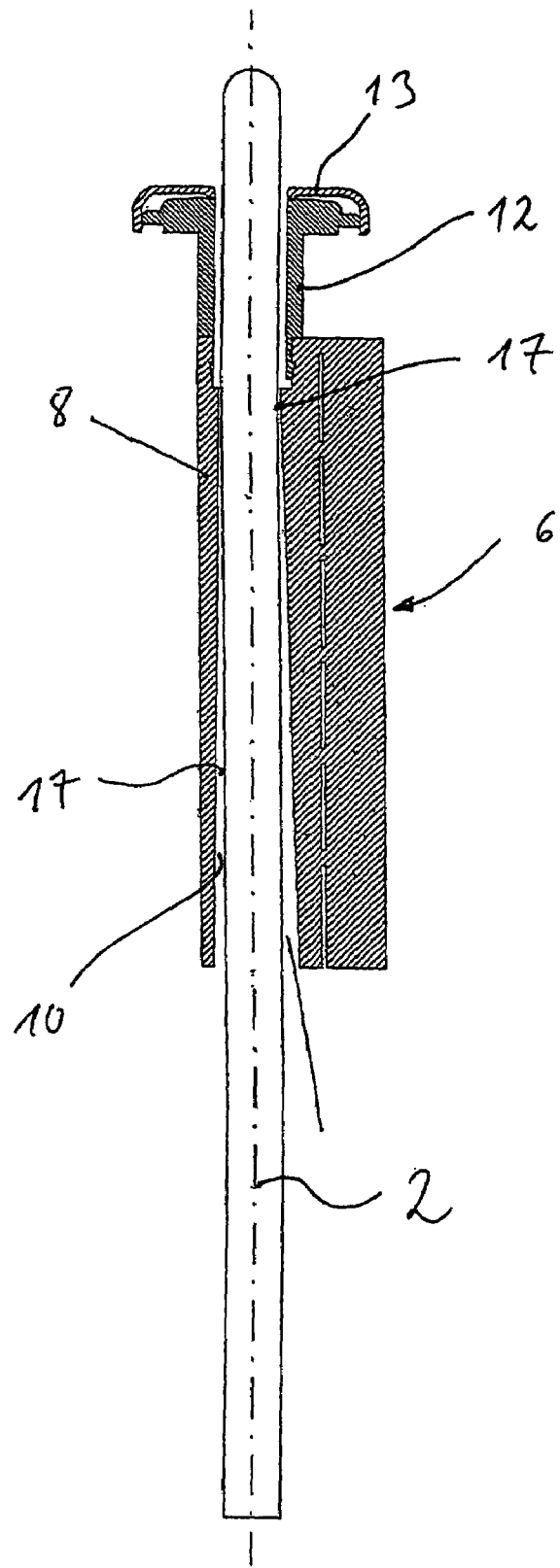
Figure 6:
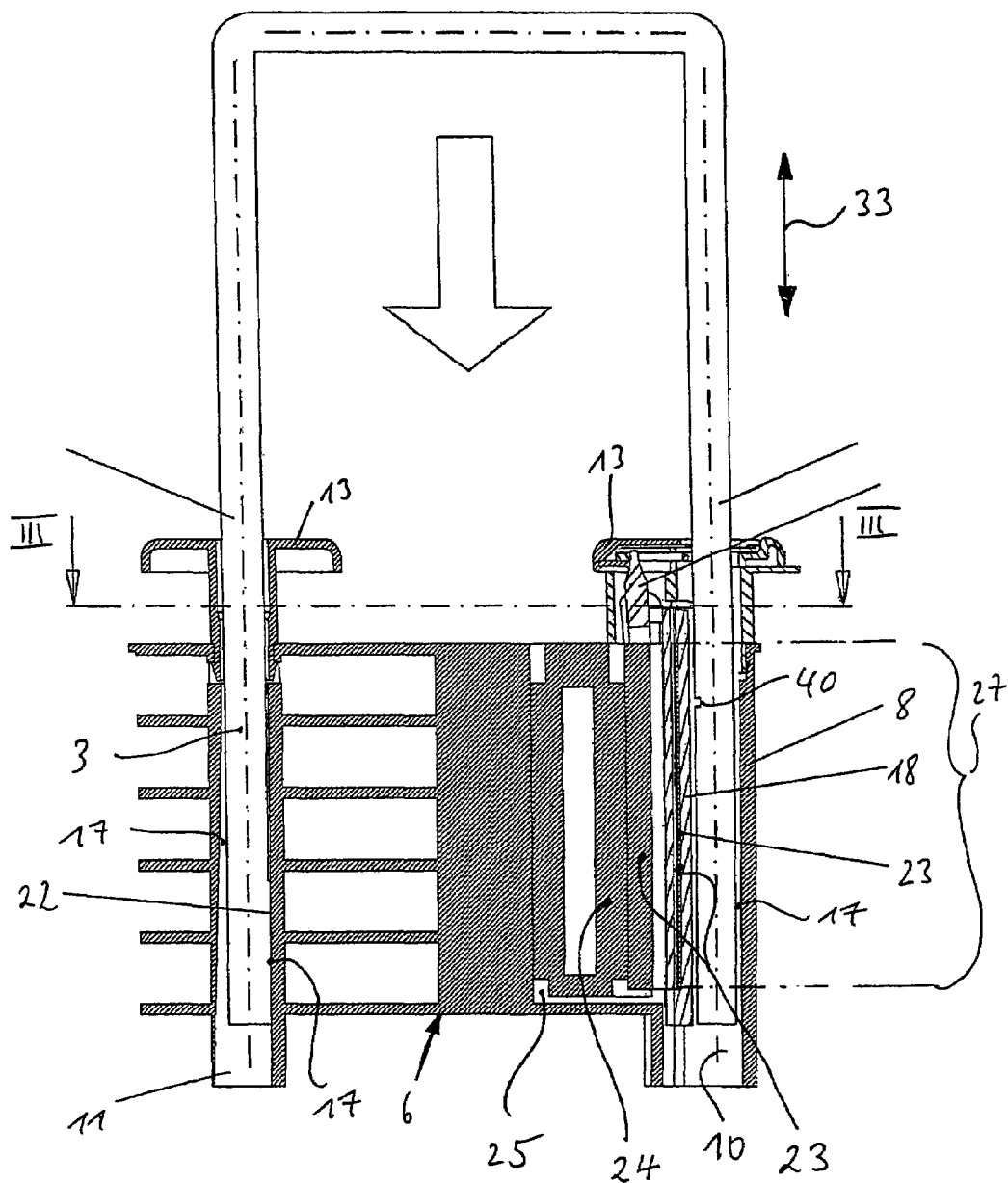
Figure 7:
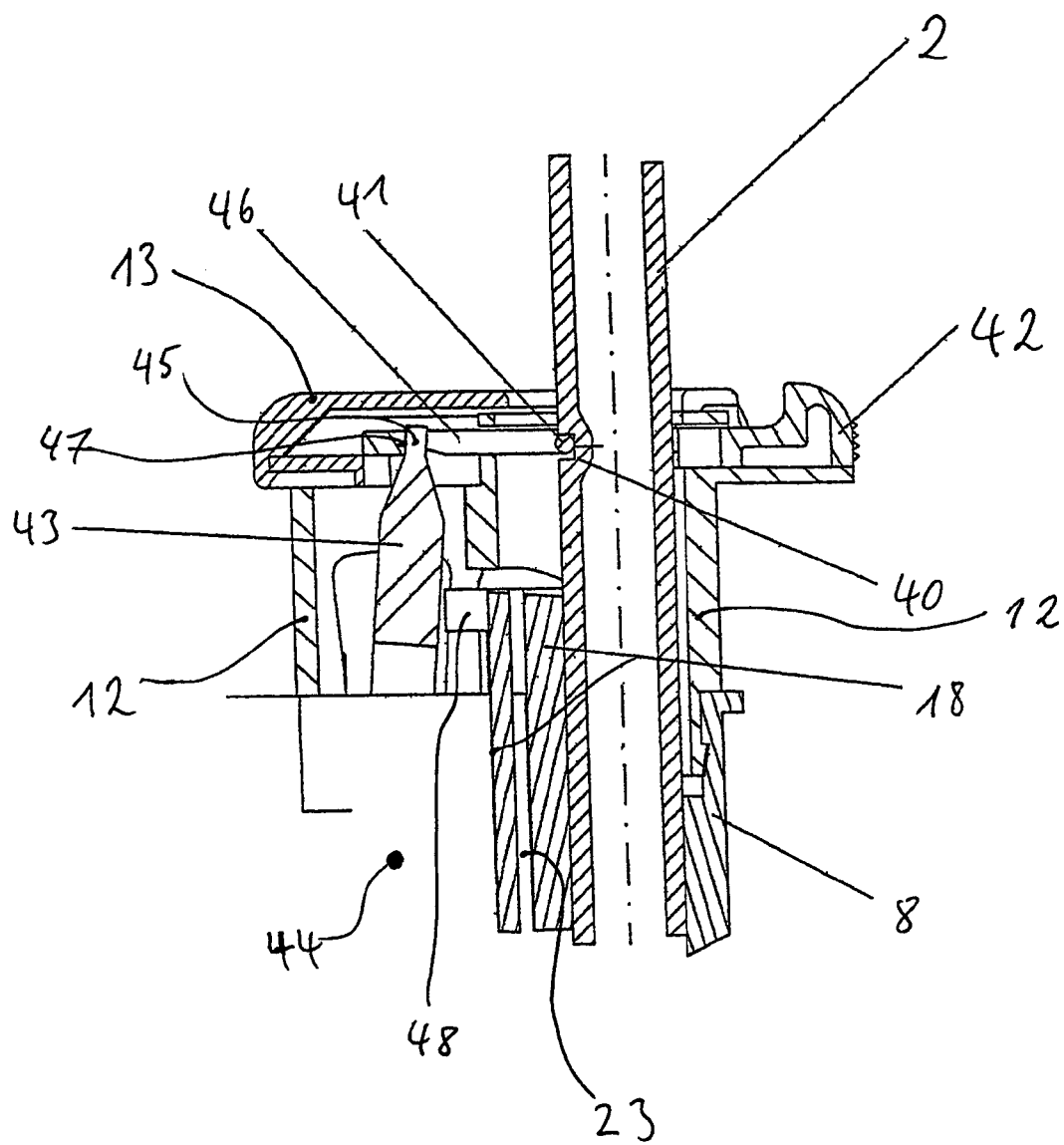
FIG. 7 an enlarged view of detail VII of FIG. 4.

Reference will now be made in detail to embodiments of the invention, one or more examples of which are illustrated in the drawings. Each example is provided by way of explanation of the invention, and not meant as a limitation of the invention. For example, features illustrated or described as part of one embodiment may be used with another embodiment to yield a third embodiment. It is intended that the present disclosure include these and other modifications and variations. In discussing various embodiments, like or similar reference numbers are used below to refer to like or similar parts of the various embodiments.

The headrest of the embodiments shown in FIGS. 1 to 8, possess the following basics of construction, which are also to be found in the embodiments shown in FIGS. 9 to 12, as well as in FIGS. 13 to 25. Each headrest, all designated with the reference number 1, comprises a head-cushion (not shown), which extends from a first holding bar 2 to a second holding bar 3. The two holding bars, seen in cross-section as being rounded, are separated from one another at a predetermined distance by a cross bar 4 and run, at least in accord with the specifications, parallel to one another. In the reclining back 5 of the seat (shown in FIG. 14) is a carrying structure 6 for the said reclining back 5, whereby this, in turn, is itself affixed to a seat framing 7. The carrier structure 6 consists of two guide parts 8, 9, which respectively circumferentially enclose a holding bar 2, 3. The open channel 10, 11, which is bounded by a guide part 8, 9 is again formed above, within a tube section 12, which is affixed on the carrier structure 6 and bears on its upper end face a covering cap 13, which lies on the upper side of the reclining seat back 5 (see also FIG. 14). The inside diameter of a channel 10, 11 is greater than the outside diameter 14 of the holding bars 2, 3. Between these and a guide part 8, 9 exists, on this account, a fully circumferential radial clearance, which principally permits a movement of the holding bar in a transverse direction. A transverse direction is that direction which extends at right angles to the longitudinal axis 16 of the vehicle. The channel 10 is extended in the transverse direction 15, and is also shaped in cross-section more or less extended, lengthened, oval opening (see FIG. 4A).

For a secure and radial fixation of the holder bars 2, 3, a clamping device is present. This clamping means includes, essentially, a narrow, slat shaped clamping element 18, which is placed in channel 10 and extends generally along the entire length of the guide part 8. The side of the clamping element 18, which is proximal to the holding bar 2 is complementary to the outside shape of the holding bar 2. In the "in use" position of the headrest 1, the clamping element 18, by means of a drive, is under pressure in a transverse direction 15 with one side 19 facing against the holding bar 2. The side 19 is within a recess 20 wherein the holding bar 2 lies, having therein a form-fit connection, transverse to the direction of the clamping force F, that is to say, at right angles to the transverse direction 15. The so form-fitted fixation of the holding bar 3 is reinforced, in that the inner side of the channel 10, which side is remote from the clamping element 18, is likewise curved complementary to the circumferential surface of the holding bar 2 and creates as shown in FIGS. 2, 3 a recess 21 to receive in a form-fitting manner, the holding bar 2 when the clamping element 18 is fixed. The clamping element 18 is freed from its state of fixation, as this fixation is shown in FIGS. 2, 4 and, as again shown in FIGS. 3, 6, becomes movable in a released condition. In this said released condition, the two recesses 20, 21 radially retract from the holding bar and allow movement of the holding bar 2 both transversely and longitudinally. The recesses 20, 21 form, when this is done, a support to guide the holding rod 2. As may be inferred from the cross-section of FIG. 5, the separating distance in the longitudinal direction of the vehicle 16, between opposite sides of the channel 10, from the top down, continually diminishes, which, further, is also the case with the channel 11 of the guide part 9. This condition assures, that in the case of unfavorable tolerances, the holding bars 2, 3 do not come into contact with the lower wall zones of the guide parts 8 and 9.

When the affixing element 18 finds itself in its fixed state, then also the second holding bar 3 presses with a circumferential surface against a recess 22 constructed within channel 11. This recess, which, together with the remaining inner circumferential zone of the guide part 9 forms a support, is also shaped by means of a wall area, which is curved to be complementary to the circumferential surface of the holding bar 3. During the released state of the clamping element 18, in accord with FIGS. 3, 6, between the holding bars 2, 3 and the guide parts 8, 9 exists an all-around radial clearance 17. The holding bars 2, 3 are thus conducted into the channels 10, 11 with only minimal friction, so that the headrest, with no other agent than its weight can move into the lowest position of elevation.

The drive, with which the clamping element 18 can toggle back and forth between its fixed position and its freed position, encompasses, as its principal components, a leaf spring 23 and an air spring 24, of which the content of air is adjustable. The leaf spring 23 and the air spring 24 are placed in a space 25 which extends nearly to the fullest extent of the width and height of the carrier structure 6. This opens with its one end in the channel 10 of the guide part 8. The width 27 (FIG. 6) of the leaf spring 23 is somewhat less than the length of the clamping element 18 and represents, to a certain extent, the height of the space 25. The end 26 of the leaf spring 23, which is proximal to the guide part 8 is bent into a hooklike shape and lies in a correspondingly shaped groove 28 within the clamping element 18. The space 25 extends on and beyond the forward or back side of the guide part 9 and tapers down to an opening 29, which opening, when seen in cross-section is somewhat hook shaped, in which opening the leaf spring, with its other, likewise hook shaped end 30, lies stationarily affixed. In the fixed position of the clamping element 18 (FIGS. 2, 4), the leaf spring 28 is seen as tensioned, and presses the clamping element 18 against the holding bar 2. This runs somewhat parallel to a wall 31 of the space 25. Between the wall 31 and the leaf spring 23 is placed the said air spring 24. By means of a control connection 32 (FIG. 1) the air spring can be filled with air. When this occurs, its side, which is remote from the wall, bulges out, whereby the leaf spring 23 is correspondingly compressed. The end 26, at this point, is moved away from the holding bar 2 and takes the clamping element 18 along with it. Between the holding bars 2, 3 and the guide parts 8, 9 is now so much clearance available, that the headrest 1, as discussed above, for no other reason than its own weight can slide downward into its lowest possible position of elevation.

The clamping element is swingingly supported about a pivot axle 34, which extends in a longitudinal bar direction 33. The said pivot axle 34 is located in a receiver channel 35, which stands in communication with the channel 10 of the guide part 8 by means of a connection channel 36. The pivot axle 34 is bound to the clamping element 18 by means of a lever arm 37. In order to enable a swing movement of the lever arm 37 in the connection channel 36, this widens in the direction of the channel 10.

The filling and the emptying of the air spring 24 is remotely controllable from the driver's seat. The driver can, accordingly, lower the headrest of the back seats, in order to maintain a free sight line to the rear. Independently of the remote controlled, gravity actuated lowering of the headrest 1 are also elevation adjustments provided, namely a lowering or raising of the head rest by hand. For this activity, the clamping force F must be so designed, that first, a loose and shaky installation of the headrest is avoided and second, the least possible bodily exertion for the elevation adjustment of the said headrest is assured. This is achieved, in that a plastic material is exclusively chosen for the clamping element, which material exhibits a low degree of friction against the metallic holding bar. Particularly adaptable for this application are the so-called alloyed plastics, also such plastic materials into which friction reducing agents have been incorporated, namely Teflon-particulate, talcum, or the like.

In another way, the friction can be reduced, in that the receiving surfaces 20, 21, 22 are so designed, that these coact with the circumferential surfaces of the holding bars 2, 3 at point or linear contacts 38, which are apportioned about the circumference, (see FIG. 4A). This arrangement, to a certain extent, can be achieved, in that the receivers 20, 21, 22 are aligned to be tangential to the circumferential surfaces of the holding bars 2, 3 and possess a flat area 39, running in the longitudinal direction 33. In FIG. 4A appears the right side view of the headrest 1 in its in-use positioning. The holding bar 2 is pressed by the clamping element 18 (this element not shown) to bring its circumferential surface against the flat surface 39. In this way, a linear contact zone 38 is created with extends itself in the longitudinal direction 38 of the said holding bar. On the left side of FIG. 4A, the situation is shown, wherein the clamping element 18, is to be found in its released condition. By this design, a radial clearance 17 on all sides, which enables a nearly friction-free lowering of the headrest 1 is made available.

On the inner side of the holding bar 2 is incised a plurality of notches 40, into which a locking wire 41 is inserted in the area of the of the cover plate 13. The locking wire 41 is can be ejected from one of the notches 40 by means of a pusher 42, which said pusher is on the cover plate 13 and acts in a transverse direction. The headrest 1 can then be brought into another position of elevation, whereby, after the release of the pusher 42, the locking wire 41 then engages in the next successive notch. So that, a remote controlled lowering of the headrest becomes possible, a movement-coupling between the clamping element 18 and the locking wire 41 is provided, in such a manner, that the restraining of the holding bar in the released state of the clamping element is removed, and in that, in the affixed state of the clamping element 18 a release of the restraint and an elevation adjustment of the headrest 1 by hand is made possible. The movement-coupling is assured by a lever arm 43, which is pivotally swingable about an axle 44 placed within the carrier structure 6. The lever arm 43, engages, with its free end 45, in a recess 46 in the pusher 42. In the holding position of the locking wire 41 (FIG. 7) the free end 45 lies in the recess 46 on that wall 47, which is remote from the locking wire 41. The other wall (not shown in FIG. 7) lies on the locking wire 41. An activation of the pusher 42, thus moves the locking wire 41 out of the notch 40. The lever arm 43 is not affected by the movement of the pusher 42, due to the presence of the recess 46. If the clamping element 18 is caused to leave its fixed position and enter into its released position, then the lever arm 43 swings to the left by means of a projection 48 protruding from the clamping element 18. When this occurs, the free-end 45 of the lever arm 43 carries with it the pusher 42. The holding bar 2 is thereby unlocked and can drop into its lowest position.

Figure 8:
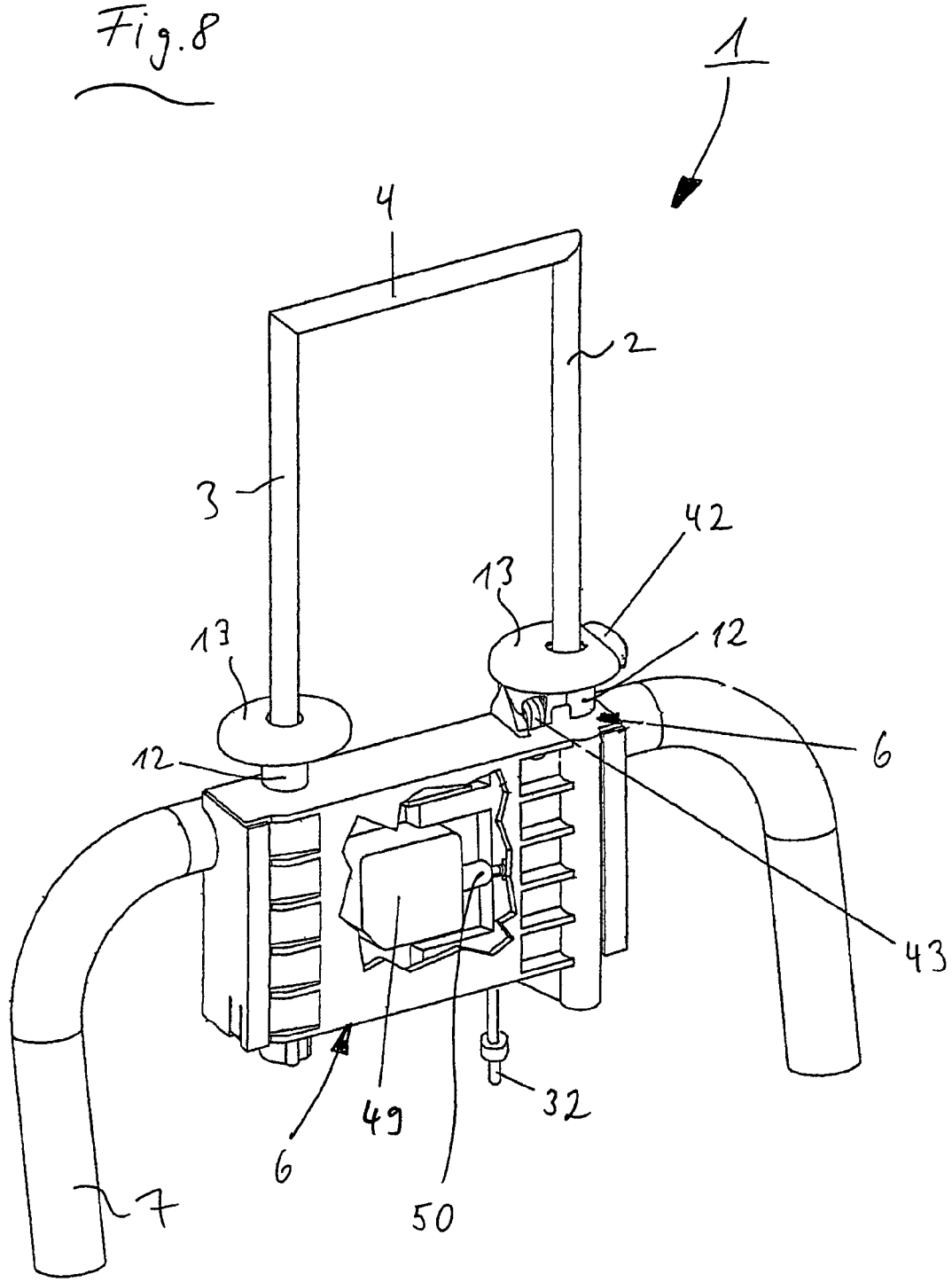
FIG. 8 a perspective of a variant of the embodiment of FIG. 1
Figure 9:
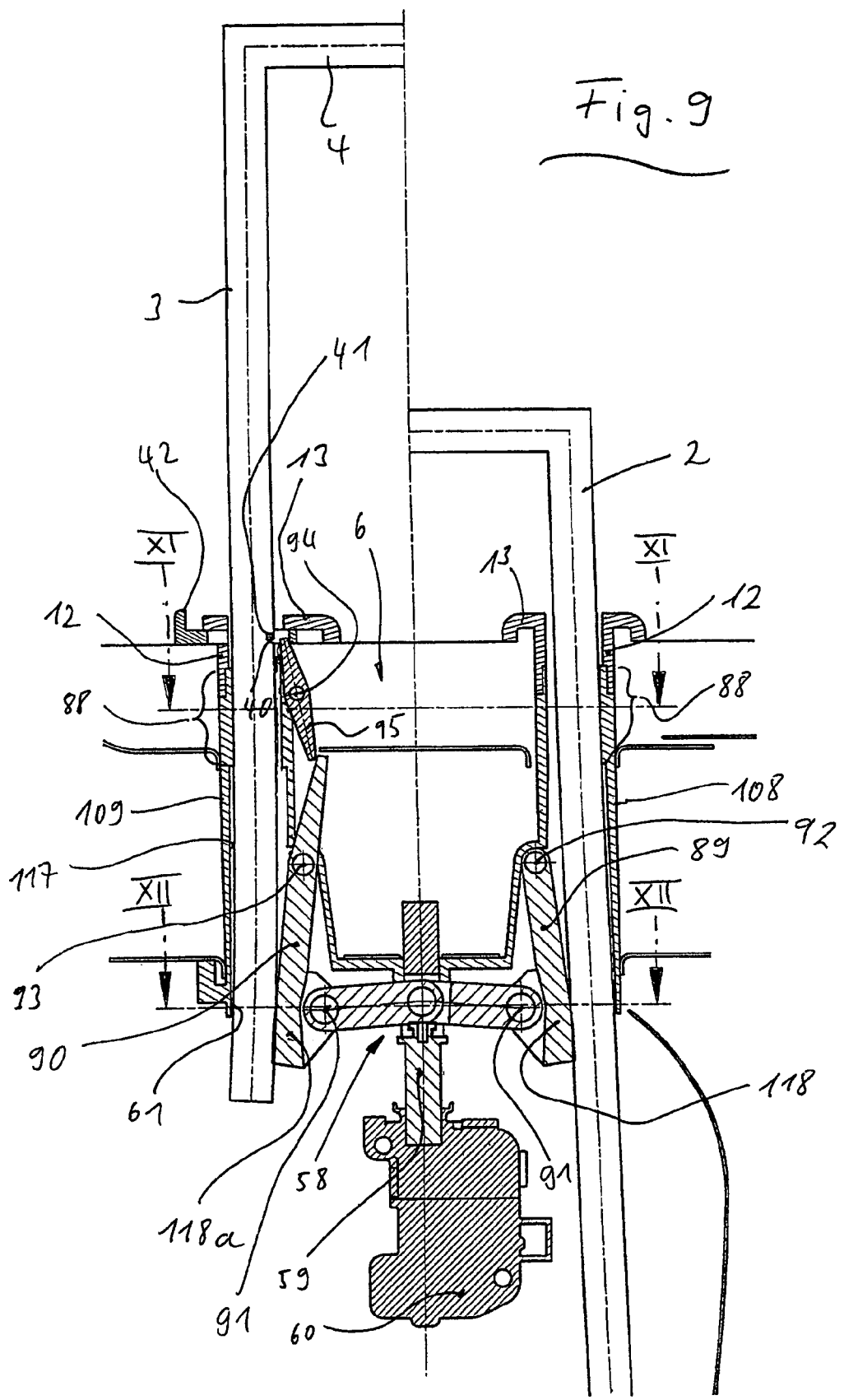
FIG. 9 a cross-section of a second embodiment in a situation wherein the headrest is fixed, and is also found in it used condition, FIG. 10 a cross-section of the assembly of FIG. 9, wherein the headrest is not fixed, and can be raised by hand or can be lowered by gravity, FIG. 11 a cross-section of the assembly of FIG. 9, taken along line XI-XI of the FIGS. 9 and 10, FIG. 12 a cross section of the assembly of FIG. 9, taken along line XII-XII of the FIGS. 9 and 10, FIG. 13 a perspective of a third embodiment, FIG. 14 a cross-section of the assembly of FIG. 13, taken along line XVI-XVI in FIG. 16, which shows the head rest in its operating state, FIG. 15 an enlarged view of a portion of FIG. 14, FIG. 16 a cross-section of the assembly of FIG. 13, taken along line XVI-XVI of FIG. 13, FIG. 17 a cross-section of the assembly of FIG. 13, taken along line XVII-XVII of FIG. 14, FIG. 18 a cross section of the assembly of FIG. 13, taken along line XVIII-XVIII of FIG. 14, FIG. 19 a cross-section of the assembly of FIG. 13, taken along line XIX-XIX of FIG. 14, FIG. 20 a cross-section of the assembly of FIG. 13, taken along line XX-XX of FIG. 15, FIG. 21 a cross-section of the assembly of FIG. 13, taken along line XXI-XXI of FIG. 15, FIG. 22 a cross-section of the assembly of FIG. 13, taken along line XXII-XXII of FIG. 15, FIG. 23 a cross-section of the assembly of FIG. 13, which shows a head rest in the released condition, FIG. 24 an enlarged view of detail XXIV of FIG. 16, and FIG. 25 an enlarged view of detail XXV of FIG. 23.
Figure 10:
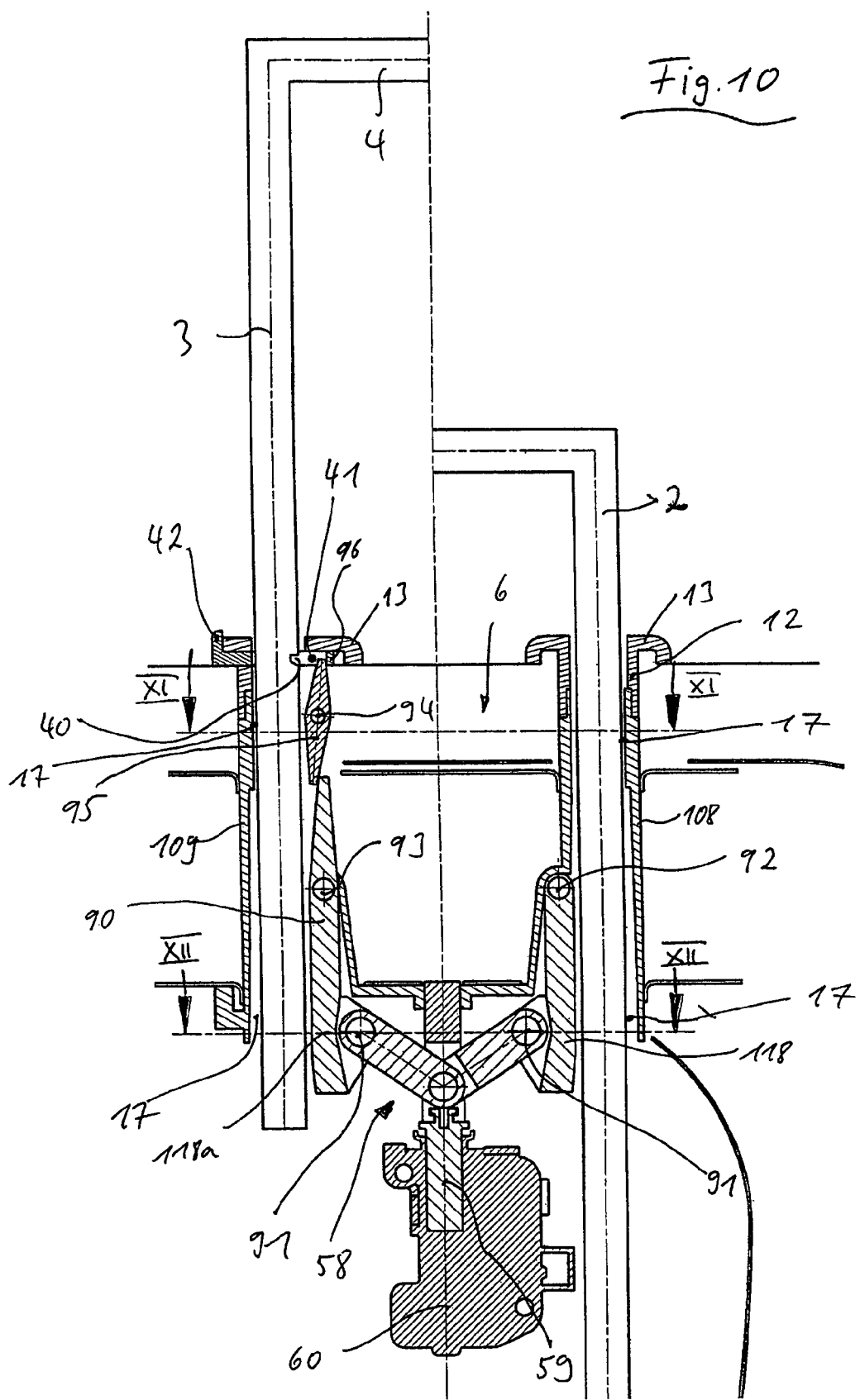
Figure 15:
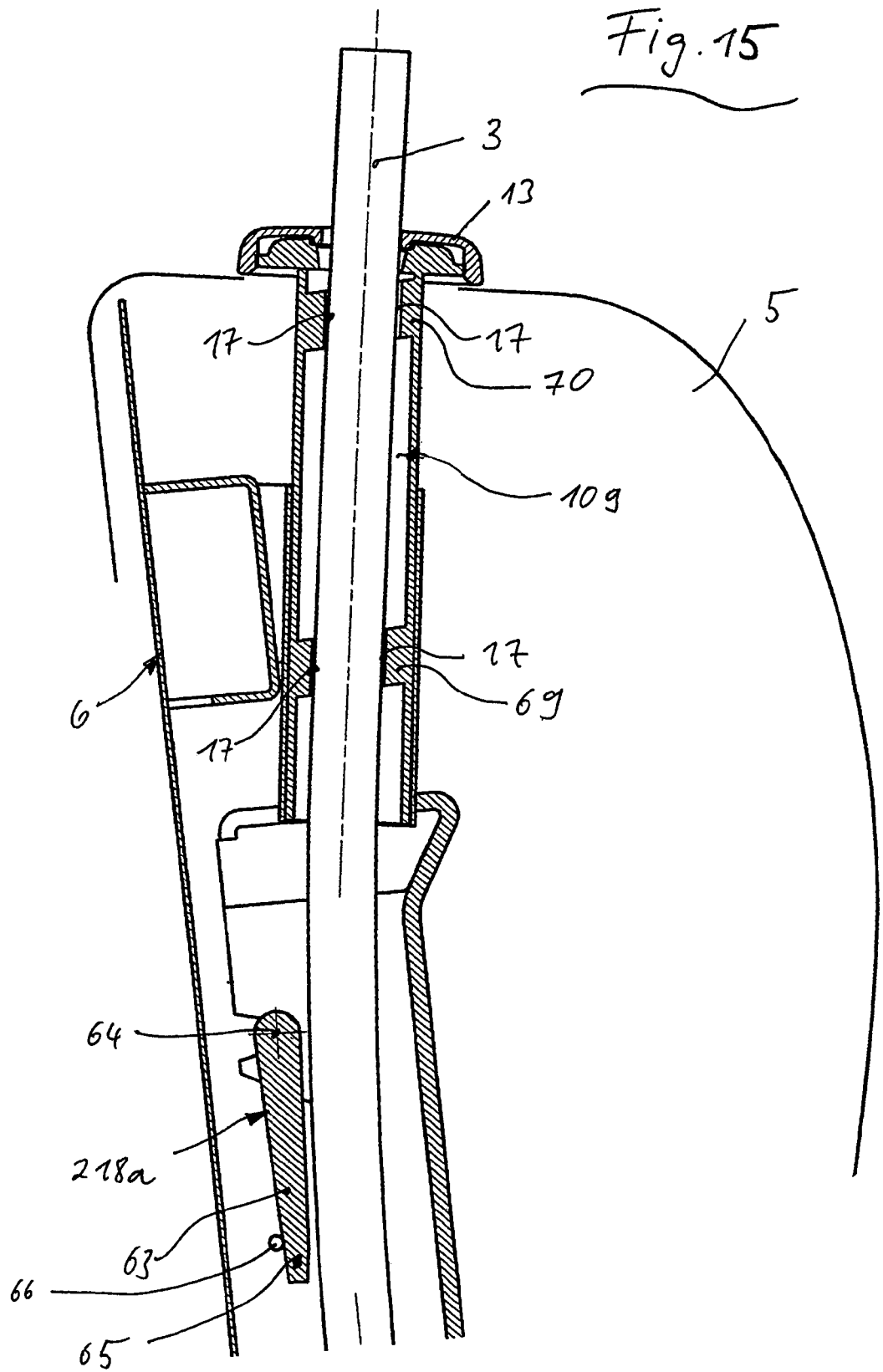
Figure 23:
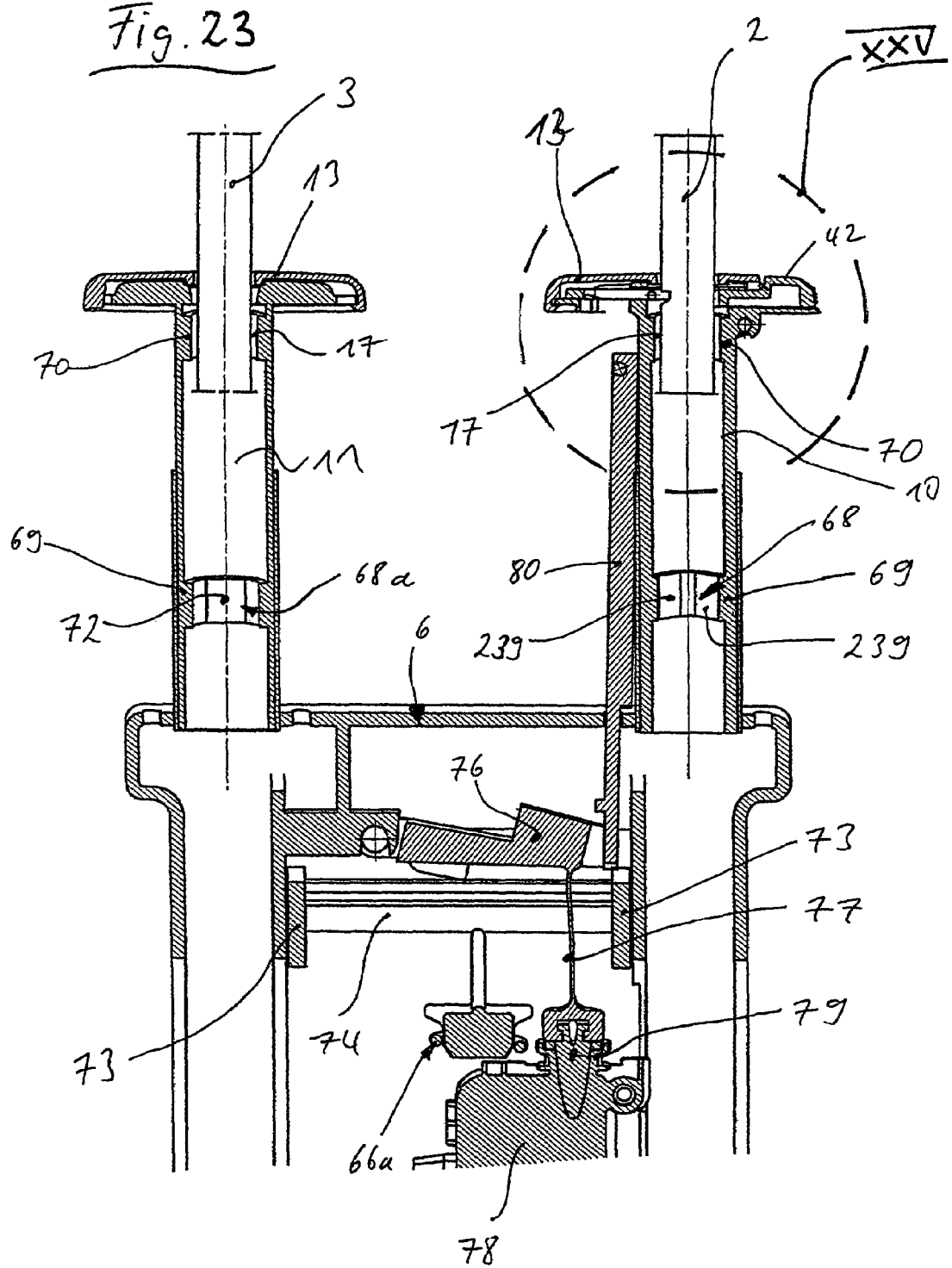

In the case of the variant shown in FIG. 8, provided as a drive in the direction of fixation of the clamping element 18, is a spring loaded membrane cylinder, or a pneumatic container 49. This is placed within the carrier structure 6 and activates the clamping element 18 by a spring loaded plunger 50 (not shown in FIG. 8). The movement of the clamping element 18 into its released state is done by charging the said pneumatic container 49 with compressed air, which is available from the connection fitting 32. Not only in the case of the variant of FIG. 8, but also regarding that in FIG. 1, the clamping force F is generated by a spring. This has the advantage, that during a deviation of the holding bars 2, 3 from their intended specified alignment, such as, for example, a fault in their being parallel, during the manual operated elevation adjustment, the holding bar 2 is always loaded with the same clamping force F. If during an elevation adjustment, the holding bar moves itself away from the clamping element 18, then this is immediately corrected by the spring action. If the holding bar approaches the clamping element 18, then it is made to retract by the spring force. Accordingly, even in the case of the tolerance deviations, there is no significant increasing of the frictional force between the holding bar 3 and the guide part 8, or the clamping element 18, so that an easy height adjustment by hand can be carried out with an equally continuing expenditure of force. Consequently, similar inherent correction actions serve as well for embodiments which are described hereunder.

Considering now the FIGS. 9 to 12, showing another embodiment, the two holding bars 2, 3, on their mutual, proximal inner sides, although in opposite directions, are subjected to force from a clamping element 118, 118a. The upper end section 88 of the guide parts 108, 109 form a guiding support for the holding bars 2, 3.

The application of force onto the holding bars 2, 3 is carried out at a lower position of the guide parts 108, 109 or on a position lying underneath the guide elements. Further, the said application of force is of such a nature that the holding bars 2, 3, upon the increasing of their separating distance, become deformed, and consequently, the separation is widened. As this occurs, the holding bars 2, 3, fronted by circumferential surface sections, which face in the transverse direction 15, are pressed into a recess 51 in the end sections 88, which, for the diminishing of frictional force, possesses two flat, inside surfaces 139. The in-use state of the headrest, that is, its condition, when the clamping elements 118, 118a find themselves in their clamping condition, is made clear in FIGS. 11 and 12 to the right, particularly for the holding bar 2. These lie with their circumferential surfaces defining touching lines 138 on the flat surfaces 139. The fixation in the transverse direction 15 is executed thus on the holding bars 2, 3 by clamping force F and in the longitudinal vehicle direction 16 by means of the form-fit between the receiving surfaces 51 and the holding bars 2, 3. A form-fit of this kind also exists between the clamping elements 118, 118a and the holding bars 2, 3, as may be inferred from FIG. 12. Also, in this case, the right portion of the illustration presents the fixed and the left portion shows the released state of the headrest 1. That side of the clamping element 118, 118a, which coacts with the holding bars 2, 3, is concavely curved and possesses two flat surfaces 52, tangential to the outside circumference of the holding bars 2, 3 and running in the longitudinal direction 33 of the bars.

That part of a clamping element 118, 188a, which coacts with a holding bar 2, 3, is subdivided by means of an axial slot 53 into at least into two extending prongs, wherein each prong 54 carries a flat surface 52. The clamping elements 118, 118a are within a housing 55 of the carrier structure 6, having small clearance 56 allowed to the housing wall 57 (FIG. 12, top view). By means of the said clearance 56, assurance is provided, that the clamping elements 118, 188a can move unhindered within the housing 55. In their closed position, the clamping elements 118, 188a are pressed against the holding bars 2, 3, with the result that these said bars are slightly and elastically bent away from one another. By means of this application of force, in the one abutting flat surface, which is inclined at an angle of 90°, the said prongs 54 are spread in the longitudinal direction 16 of the vehicle, and accordingly press against the inner surface of the housing wall 57. Thereby, a zero-clearance, form-fit between the holding bars 2, 3 and the clamping elements 118, 118a, acting in the longitudinal direction 16 of the vehicle is assured. The clamping elements 118, 118a are connected by means of a knee joint linkage 58 to the plunger 59, which is actuated by an electric motor 60. In order to assure the continuity of a constantly equal clamping force onto the holding bars 2, 3, it is possible to place in the force transmission line between the knee joint 58 and the plunger 59 a spring element, preferably in the form of a torsion spring (not shown).

As is especially to be learned from FIG. 12, the holding bars 2, 3 are not pressed by the clamping elements 118, 118a against a solid, mechanical detent, such as the wall of a guide part 108, 109, but a separating distance 61 remains therein-between, which is shown for clarity, in a somewhat exaggerated manner, in FIG. 12. The holding bars 2, 3 lie, not only on the clamping elements 118, 188a, but also on the recess 51 of the guide parts 108, 109. Furthermore, the clear inside width of the guide parts 108, 109 are so dimensioned, that a contact between the holding bars 2, 3 and the guide part 108, 109 is prevented. The guidance of the holding bars 2, 3 is carried out exclusively in the area of the end section 88 and proximal to the clamping element 118, and moreover with an elevation adjustment without radial clearance 17 and having a gravity lowering with a radial clearance 17. The clamping elements 118, 118a are designed as lever arms 89, 90, which extend in the longitudinal direction 33 of the bars.

On their lower ends, the lever arms 89, 90 are bound by linkage to the knee joint 58. The lever arm 89 is further bound on its upper end by means of a linkage 92 with the carrier structure 6. The lever arm 90 is longer than the lever arm 89, but however, at the same connection elevation as the lever arm 89, and is connected by means of a linkage 93 to be pivotal with the carrier structure 6. The axles of the stated linkages 91, 92, 93 run in the longitudinal direction of the vehicle. The lever arm 90 acts with its upper end together with an adjacent lever arm 95, which is pivotally carried by a centrally placed axle 94, which axle extends in the longitudinal direction of the vehicle. In the released position of the clamping elements 118, 118a the said lever arm 90, with its upper end, applies pressure on the lower end of the lever arm 95. This then rotates to the extent, that its upper end, which coacts on a detent 96 of the pusher 42, and brings this into a position, in which a locking wire 41 is brought out of its engagement in a notch 40 in the holding bar 3. The head rest 1 is then freely movable with its holding bars 2, 3 in the guide parts 108, 109. In the fixed position of the clamping elements 118, 118a, the lever arm 95 is retracted into its starting position by the pusher 42, in which the lever arm 95 lies with its under end on the upper end of the lever arm 90. The sides of the clamping elements 218, 218a which coact with the holding bars are designed as flat surfaces which extend in the transverse direction 15.

In FIGS. 13 to 25, another embodiment is presented, wherein, contrary to the above described embodiments, the holding bars 2 and 3 are to be found not in the transverse direction 15, but rather in the longitudinal direction 16 of the vehicle, more exactly in the travel direction 62. Accordingly, an efficient form-fit is made in the transverse direction, between the guide parts 208, 209 and the holding bars 2, 3. The clamping elements 218, 218a are constructed of two lever arms 63 extending themselves approximately in the same direction as the holding arms, which clamping elements, respectively are pivotally carried about a respective axle 64 which is affixed to the carrier structure 6. The downward pointing free ends 65 of the lever arms 63 are respectively under pressure from the arms 66 of a spring extension 66a, which referred pressure works against the circumferential surface of each of the holding bars 2, 3. These bars, again can be slightly, elastically deformed thereby, which, however, for a secure fixation of the headrest 1 is not necessary. In the guide parts 208, 209 is to be respectively found for the holding arms 2, 3 an upper bearing, made from a first projecting ring 70 extending itself radially inward and also a lower bearing, made from a second projecting ring 69, again extending itself inward. In the inside circumferences of the projecting rings 69, 70 are located the recesses 67, 68. The recess 67 of the upper projecting ring 70 is located on that side of a holding bar 2, 3, which faces into the direction of travel 62, where, conversely, the recess 68 of the lower projecting ring 69 is to be found on that side of the holding bar 2, 3 which faces contrary to the direction of travel 62. The recesses 67, 68 which coact with the holding bar 2 comprise flat surfaces 239, which are tangential to the circumferential surface of the holding bar 2 and run in the longitudinal direction 33 thereof and enclose an angle. In the fixed position of the clamping element 218, the holding bar 2 acts to form a contact line 238 together with the flat surfaces 239. Thereby, an active form-fit, in the transverse direction 15 is made between the holding bar 2 and the guide part 208.

The receiving recesses 67a, 68a of the guide part 109, which coact with the holding bars 2, 3, possess a flat surface 72 which extends in the transverse direction 15, onto which the holding bar 3 lies with a line shaped contact position 238. This arrangement assures, that, in the case of a manual elevation adjustment, when a faulty parallel alignment of the holding bars 2, 3 exists, the holding bar 3 can carry out a movement in the transverse direction 15 while the holding bar 2 is guided without clearance in the transverse direction 15 within the recesses 67 and 68.

On the inner sides of the lever arms 63, which face one another, is placed an extension piece 73, which runs in the direction of travel 62. The pivoting of this extension piece 73 downward so acts, that the clamping elements 218, 218a are moved into their released condition. For the pivoting, the free ends of the extension piece 73 are bound together by a somewhat strip shaped bridge component 74. On its upper edge, the bridge 74 possesses a projecting detent 75, which acts counter to the travel direction 62. On the carrier structure 6 is linkedly connected a lever 76, which extends in a transverse direction 15. The free end of the lever 76 is in turn bound by a connection piece 77 to a plunger 79, which is moved by an electric motor 78 in, somewhat, the direction 33 of a holding bar. If the plunger 79 is moved downward by the electric motor 78, then the lever 76 takes the bridge component 74 along with it. When this occurs, the extension piece 73 swings downward and accordingly, the thereon attached lever arm 63 enters into its released position (see FIGS. 15 and 20 to 23). In the released position the holding bars 2, 3 are conducted through the bearings made by the ring projections 69, 70 with a radial clearance 17 on all sides. The radial clearance, in this instance, is so dimensioned, that even a curved holding bar 2, 3, as in the previous embodiment, is so guided, that a lowering of the headrest 1 is possible because of its weight.

A restraining of the headrest 1 at various positions of elevation is realized in the same manner and way as has been described previously for the embodiments explained above. This restraint would be by means of a locking wire 411 which has engaged in a notch 40. Such a restraint can be relieved by a pusher 42. The moving-coupling between the clamping elements 218, 218a and the pusher 42 is done by means of a plunger 80 (FIGS. 13, 24, 25) which is located somewhat in the upper area, extending in the holding bar direction 33, but only up to just below the cover plate 13. At the upper end of the said plunger 80, are two angle levers 81, which border the guide part 208 on both sides. Further, the angle levers are connected together by a linkage 97. Each of which levers 81 possesses a first arm 82 which extends somewhat in a transverse direction 15 and a second arm 83, which is affixed to the free end of the said first arm 82. The second arm 83 extends approximately in a direction 33 parallel to the longitudinal axis of the holding rod. At the connection point between the arms 82, 83, the angle levers are bound together by an axle 84 running in the longitudinal direction 16 of the vehicle. The axle 84 is turnably enclosed in a bearing 85, which is an integral element of the of the guide part 208. With its free end (not shown) the arm 83 engages itself in a recess 27 of the pusher 42. The recess 27 is located in underside location and extends itself in the transverse direction. Further, the arm 83, with its side which faces the holding bar 2, coacts with a detent surface 86.

Figure 24:
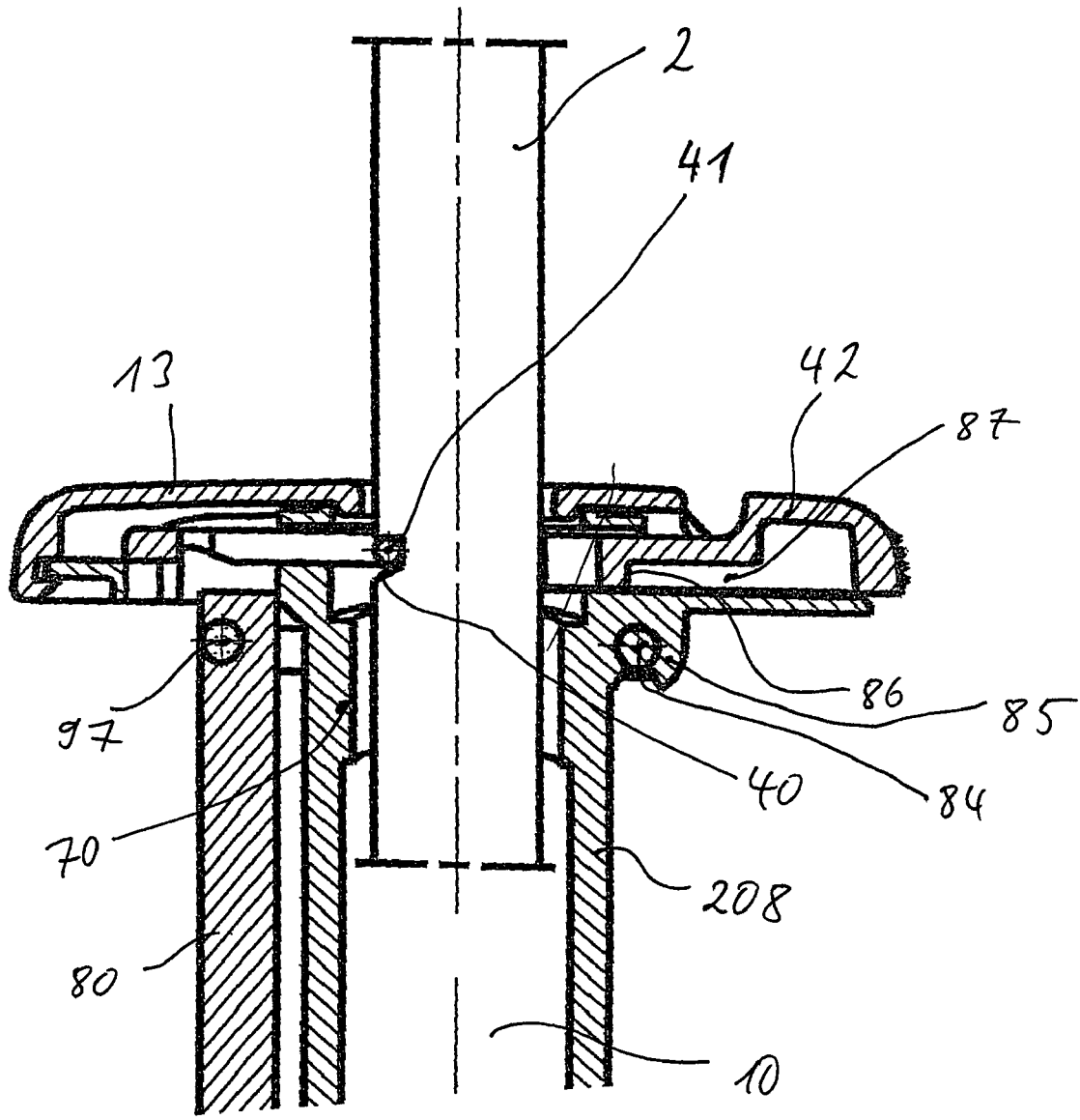
Figure 25:
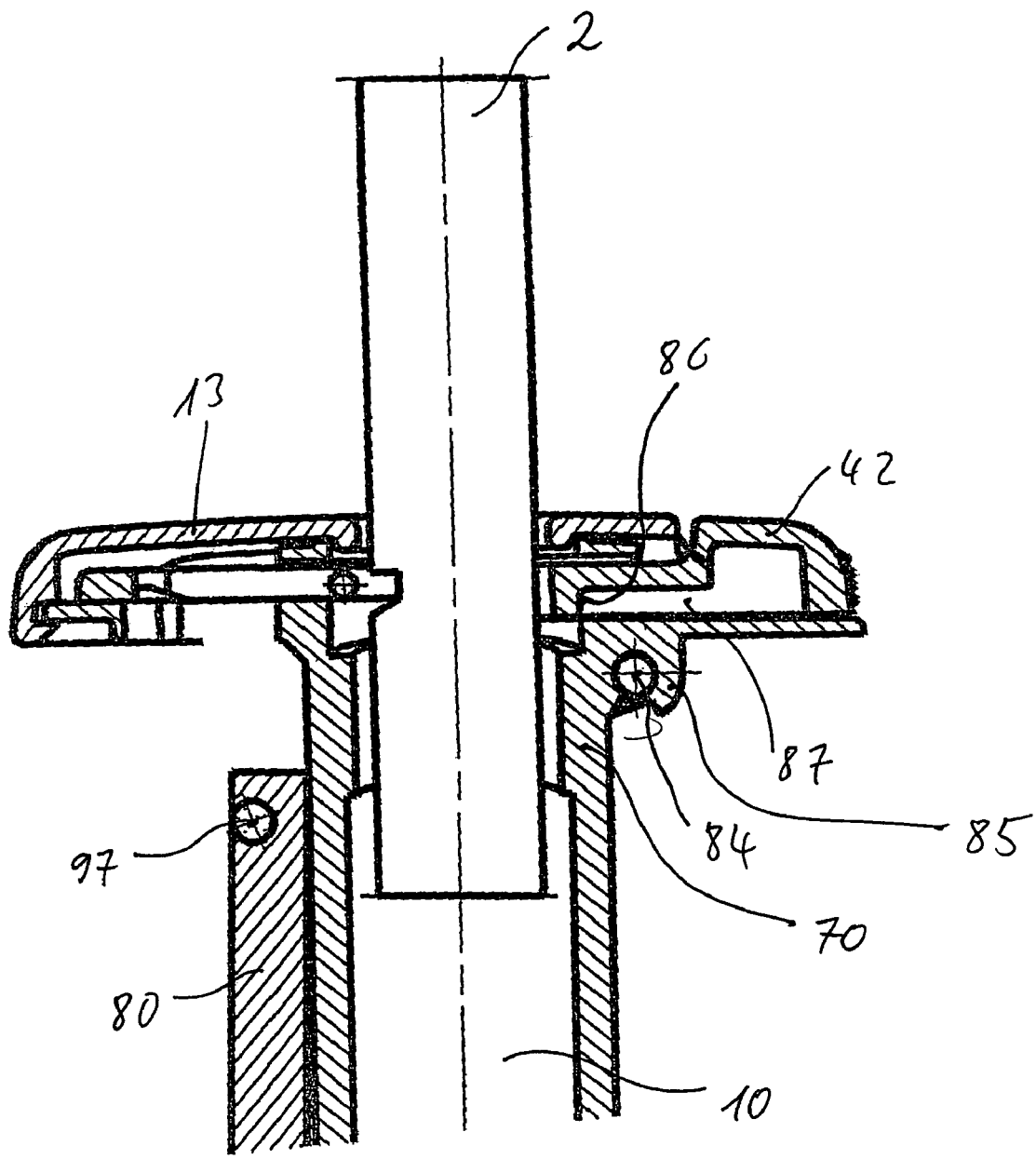

Upon a manual positional adjustment of the headrest 1, the pusher 42 would be activated in order to free the restraints to the movement thereof, that is, in FIG. 24 the pusher 42 would be pushed to the left. When this occurs, then the locking wire 41 is ejected from its enclosure in the notch 40. On the account of the recess 87, the arm 83, which is engaged in the underside of the pusher 42, does not obstruct the pushing movement. If, however, starting considerations from the situation shown in FIG. 24, the clamping elements 218, 218a occupy their released position, in which the lever 76 has been pivoted down by the electric motor, then the plunger 80, because of its drive-like connection with the lever 76 is also moved down along with the angle lever 81 on its end, which is connected to the said plunger 60. The result is, that the arm 83 of the angle lever 81 abuts against the detent surface 86 of the pusher 42, so that this is activated and the locking wire is expelled from its engagement in the notch 40. The headrest, accordingly, can drop into its lowest position by the force of gravity.

It should be understood that various modifications and variations of the above are possible within the scope of the invention, as defined by the following claims and their equivalents.

The invention claimed is:

1. A vehicle seat comprising:
    a seat back;
    a headrest mounted to at least one first holding bar, adjustably placed in a guide part within a carrying structure affixed to the seat back, the guide part encompassing, with radial clearance, the holding bar; and
    a clamping element movable between an affixed position and a released position by a remotely controlled drive, the clamping element, when in its affixed position, exerts a clamping force upon the holding bar in a direction transverse to the longitudinal direction thereof, whereby an outer section of a circumference of the holding bar is pressed against the guide part, the guide part configured so that the holding bar, when subjected to the clamping force, is positionally and form-fittingly fixed therewithin, transversely to the clamping force.

2. A vehicle seat in accord with claim 1, wherein the guide part possesses a circumferential zone which creates a receiving means to accept the holding bar in a form-fit manner.

3. A vehicle seat in accord with claim 1, wherein the guide part is configured with the holding bar about the circumference thereof in point or line contacting locations separated by predetermined distances.

4. A vehicle seat in accord with claim 1, further including a hand operated restraining apparatus for the fixation of the head rest at different levels of elevation, which is motion-coupled with the clamping element so that the restraint of the holding bar is relieved in the released position of the clamping element, and so that in the affixed position of the clamping element, a release of the restraining apparatus and a manual elevation adjustment of the headrest is made possible.

5. A vehicle seat in accord with claim 1, wherein the clamping element is subjected to a spring force acting in a fixation direction and, for a force in the opposite direction, the clamping element is activated by a servomotor.

6. A vehicle seat in accord with claim 5, wherein the spring force is generated by a leaf spring, one end of which is stationarily fixed and the other end thereof is bound to the clamping element, and the servomotor is on an air spring placed on a flat side of the leaf spring and which air spring has a controllable degree of filling, a curvature of the leaf spring being changeable by changing the degree of filling of the air spring.

7. A vehicle seat in accord with claim 6, wherein the leaf spring and the servomotor are part of a pneumatic cylinder system.

8. A vehicle seat in accord with claim 1, further including a second holding bar which is directly or indirectly bound to the first holding bar, and one of the holding bars is subjected to a transversely directed force from the clamping element.

9. A vehicle seat in accord with claim 8, wherein one of the holding bars is subjected to force from the clamping element, so that both holding bars elastically distort themselves upon a change of their separating distance.

10. A vehicle seat in accord with claim 8, wherein an effective form fit is created between the clamping element in the affixed position and the holding bar.

11. A vehicle seat in accord with claim 10, wherein the clamping element has a concavely curved surface which respectively coacts with the outer section of the circumference of the holding bar.

12. A vehicle seat in accord with claim 8, further including a second clamping element, wherein to each holding bar one of the clamping elements is assigned, whereby the holding bars when in the affixed position are subjected to respective clamping forces acting in opposite directions.

13. A vehicle seat in accord with claim 12, wherein the clamping elements and a common servomotor assigned thereto are placed between the holding bars.

14. A vehicle seat in accord with claim 13, wherein the clamping elements are mutually bound by means of a knee joint juncture to the common servomotor.

15. A vehicle seat in accord with claim 1, wherein the guide part includes an upper bearing and a lower bearing, and the clamping element is located beneath the lower bearing and exerts a clamping force on the holding bar in a direction of travel, whereby the holding bar engages a receiver located in a section of an inner circumference of the lower bearing facing in the direction of travel, and engages a receiver located in a section of an inner circumference of the upper bearing facing away from the direction of travel.

16. A vehicle seat in accord with claim 15, wherein the clamping element is constructed from a lever arm, which is pivotal about a transversely directed axle and which has a downwardly-directed free end that coacts with the holding bar.

17. A vehicle seat in accord with claim 15, wherein the headrest possesses a second holding bar disposed in a second guide part, the second guide part enabling a clearance of the second holding bar in the transverse direction.

18. A vehicle seat in accord with claim 17, wherein the second guide part includes a receiver having a flat surface extending in a transverse direction.

19. A vehicle seat in accord with claim 17, wherein the clamping element includes a projection extending in the direction of travel, the projection being integral, molded on part of the clamping element and being pivotal downward via a servomotor.

20. A vehicle seat in accord with claim 19, wherein each guide part includes one of the clamping elements with one of the projections, the projections being bound together by means of a bridge component, which is connected to the servomotor.

21. A headrest adjustment assembly for adjusting a position of a headrest relative to a seat back, the headrest adjustment assembly comprising:
a guide adapted to be disposed in the seat back;
at least one holding bar disposed within the guide, the guide and holding bar being configured with sufficient clearance to allow selective relative longitudinal and transverse sliding, the holding bar being adapted to be fixed to the headrest; and
a clamping element adapted to be mounted to the seat back for selectively applying a transverse force to the holding bar to thereby fix a position of the holding bar within the guide and prevent relative transverse or longitudinal sliding.

22. The assembly of claim 21, wherein the guide has an inner surface for discontinuously contacting the holding bar when the clamping element applies the transverse force.

23. The assembly of claim 22, wherein the discontinuous contact is applied in one of at least one point or line contact positions.

24. The assembly of claim 21, further including a controller for the clamping element for moving the clamping element between a holding position and a release position, the holding bar being slidable within the guide when the clamping element is in the release position, the holding bar being fixed within the guide when the clamping element is in the fixed position.

25. The assembly of claim 21, wherein the clamping element is urged toward the fixed position by a spring and is movable to the release position by a servomotor.

26. The assembly of claim 21, wherein the at least one holding bar includes two of the holding bars, and the assembly includes two of the clamping elements, each of the clamping elements acting on a respective holding bar and applying the respective transverse force in opposite directions.

27. The assembly of claim 21, wherein the guide is configured to allow a degree of pivoting of the holding bar therein.

* * * * *